(12) United States Patent
Peng et al.

(10) Patent No.: US 12,469,905 B2
(45) Date of Patent: Nov. 11, 2025

(54) BUTTON CELL AND ELECTRONIC EQUIPMENT

(71) Applicant: Zhuhai CosMX Battery Co., Ltd., Zhuhai (CN)

(72) Inventors: Ning Peng, Zhuhai (CN); Bin Xie, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 560 days.

(21) Appl. No.: 18/061,867

(22) Filed: Dec. 5, 2022

(65) Prior Publication Data

US 2023/0102775 A1 Mar. 30, 2023

Related U.S. Application Data

(63) Continuation of application No. PCT/CN2021/094182, filed on May 17, 2021.

(30) Foreign Application Priority Data

Jun. 3, 2020 (CN) .......................... 202010496417.7
Dec. 4, 2020 (CN) .......................... 202011402878.X

(51) Int. Cl.
*H01M 50/109* (2021.01)
*H01M 50/169* (2021.01)
(Continued)

(52) U.S. Cl.
CPC ....... *H01M 50/109* (2021.01); *H01M 50/169* (2021.01); *H01M 50/528* (2021.01); *H01M 50/636* (2021.01)

(58) Field of Classification Search
None
See application file for complete search history.

(56) References Cited

U.S. PATENT DOCUMENTS 7,341,802 B1 * 3/2008 Ota .................... H01M 50/191
429/181
9,564,654 B2 2/2017 Wang et al.
(Continued)

FOREIGN PATENT DOCUMENTS

CN 1134042 A 10/1996
CN 1618140 A 5/2005
(Continued)

OTHER PUBLICATIONS

The Non-Final Office Action dated Mar. 4, 2022 for U.S. Appl. No. 17/127,252.
(Continued)

*Primary Examiner* — Scott J. Chmielecki

(57) ABSTRACT

A button cell includes a housing and a cover plate assembly, the housing including a bottom wall and an annular side wall integrally formed with the bottom wall, the cover plate assembly including a head cover, a conductive member and a conductive covering member. The middle area of the head cover has a through hole, and the conductive member covers the through hole and is connected with the head cover in an insulated manner; the outer edge of the head cover is welded with the top end of the side wall to form an accommodating cavity for accommodating an electrode assembly and electrolyte; the conductive member has a liquid injection port for injecting electrolyte into the accommodating cavity, and the conductive covering member covers the liquid injection port and is electrically connected with the conductive member. An electronic equipment includes an electronic equipment body and the button cell.

20 Claims, 19 Drawing Sheets

(51) Int. Cl.
  *H01M 50/528* (2021.01)
  *H01M 50/636* (2021.01)

(56) References Cited

U.S. PATENT DOCUMENTS

| | | | |
|---|---|---|---|
| 10,224,519 | B2 | 3/2019 | Kawada et al. |
| 11,862,806 | B2 | 1/2024 | Peng et al. |
| 2002/0142216 | A1 | 10/2002 | Skoumpris |
| 2003/0211388 | A1 | 11/2003 | Ruth et al. |
| 2006/0099502 | A1 | 5/2006 | Kim et al. |
| 2007/0117011 | A1 | 5/2007 | Myerberg et al. |
| 2014/0050948 | A1 | 2/2014 | Hashimoto et al. |
| 2015/0047180 | A1 | 2/2015 | Schmidt et al. |
| 2017/0170450 | A1 | 6/2017 | Guen |
| 2017/0187027 | A1 | 6/2017 | Ono et al. |
| 2017/0207491 | A1* | 7/2017 | Tamachi ............ H01M 50/107 |
| 2018/0145289 | A1 | 5/2018 | Yu et al. |
| 2021/0242438 | A1* | 8/2021 | Lee .................... H01M 50/147 |
| 2021/0408626 | A1* | 12/2021 | Ko ..................... H01M 50/107 |
| 2024/0088494 | A1 | 3/2024 | Peng et al. |
| 2024/0120586 | A1 | 4/2024 | Peng et al. |

FOREIGN PATENT DOCUMENTS

| | | | |
|---|---|---|---|
| CN | 2833898 | Y | 11/2006 |
| CN | 101305481 | A | 11/2008 |
| CN | 201436694 | U | 4/2010 |
| CN | 102349176 | A | 2/2012 |
| CN | 204596910 | U | 8/2015 |
| CN | 105895848 | A | 8/2016 |
| CN | 106159350 | A | 11/2016 |
| CN | 106654077 | A | 5/2017 |
| CN | 107068960 | A | 8/2017 |
| CN | 107768586 | A | 3/2018 |
| CN | 207282605 | U | 4/2018 |
| CN | 108023037 | A | 5/2018 |
| CN | 108172700 | A | 6/2018 |
| CN | 207651537 | U | 7/2018 |
| CN | 109192889 | A | 1/2019 |
| CN | 110459705 | A | 11/2019 |
| CN | 209804717 | U | 12/2019 |
| CN | 110828885 | A | 2/2020 |
| CN | 210224214 | U | 3/2020 |
| CN | 211238301 | U | 8/2020 |
| CN | 111613739 | A | 9/2020 |
| CN | 111900275 | A | 11/2020 |
| CN | 212434722 | U | 1/2021 |
| CN | 212434725 | U | 1/2021 |
| CN | 112531242 | A | 3/2021 |
| EP | 4050708 | A1 | 8/2022 |
| FR | 3034912 | A1 | 10/2016 |
| JP | H0265066 | A | 3/1990 |
| JP | 2000268811 | A | 9/2000 |
| JP | 2011216479 | A | 10/2011 |
| JP | 2014026865 | A | 2/2014 |
| JP | 2015176637 | A | 10/2015 |
| JP | 2019046639 | A | 3/2019 |
| JP | 2019145376 | A | 8/2019 |
| KR | 10-2020-0020173 | A | 2/2020 |
| WO | WO2015066078 | A1 | 5/2015 |
| WO | WO2019013326 | A1 | 1/2019 |
| WO | WO2021185074 | A1 | 9/2021 |
| WO | 2021244272 | A1 | 12/2021 |
| WO | 2021244618 | A1 | 12/2021 |

OTHER PUBLICATIONS

The Final Office Action dated Jun. 28, 2022 for U.S. Appl. No. 17/127,252.
The Non-Final Office Action dated Nov. 28, 2022 for U.S. Appl. No. 17/127,252.
The Final Office Action dated May 2, 2023 for U.S. Appl. No. 17/127,252.
The Office Action dated May 18, 2023 for Chinese Application No. 202010496417.7.
The First Office Action dated Oct. 11, 2021 for Chinese Application No. 202011402878.X.
The Second Office Action dated Apr. 25, 2022 for Chinese Application No. 202011402878.X.
International Search Report dated Apr. 29, 2021 for International Application No. PCT/CN2021/078680.
Office Action dated Jun. 28, 2022 for U.S. Appl. No. 17/127,252.
Office Action dated Mar. 4, 2022 for U.S. Appl. No. 17/127,252.
Office Action dated Nov. 28, 2022 for U.S. Appl. No. 17/127,252.
European Search Report dated Jun. 17, 2021 for Application No. 20217378.7.
Office Action dated Jan. 26, 2022 for European Application No. 20217378.7.
Non-final Office Action dated Aug. 8, 2024 for U.S. Appl. No. 18/512,103.
Non-final Office Action dated Aug. 8, 2024 for U.S. Appl. No. 18/512,145.
Decision to Grant Patent dated Jul. 30, 2024 regarding Japanese Patent Application No. 2022-574616.
Extended European Search Report dated Jan. 31, 2024 regarding application No. 21818650.0.
Notice of Reasons for Refusal dated Jan. 25, 2024 for Japanese Patent Application No. 2022-574616.
Extended European Search Report dated Jan. 31, 2024 regarding application No. 21818153.5.
Extended European Search Report dated Sep. 15, 2023 regarding application No. 23177520.6.
Extended European Search Report dated Sep. 15, 2023 regarding application No. 23177530.5.
Notice of Allowance dated Aug. 30, 2023 regarding U.S. Appl. No. 17/127,252.
Non-Final Office Action dated Jun. 3, 2025 for U.S. Appl. No. 18/061,402.

* cited by examiner

BUTTON CELL AND ELECTRONIC EQUIPMENT

CROSS-REFERENCE TO RELATED APPLICATIONS

This application is a continuation of International Application No. PCT/CN2021/094182, filed on May 17, 2021, which claims priority to Chinese Patent Application No. 202010496417.7 filed on Jun. 3, 2020 and Chinese Patent Application No. 202011402878.X filed on Dec. 4, 2020. All of the aforementioned patent applications are hereby incorporated by reference in their entireties.

TECHNICAL FIELD

The present application relates to the technical field of cell, in particular relates to a button cell and an electronic equipment.

BACKGROUND

Button cell refers to a cell with an outline dimension like a button. Generally speaking, its diameter is larger and its thickness is thinner. Because of its small size, button cell has been widely used in various microelectronic equipment, such as wearable electronic equipment field, medical product field, etc.

Because the interior of the button cell belongs to a closed space, the sealing performance is extremely important for the button cell. However, the sealing performance of the button cell in the prior art is poor.

SUMMARY

One aspect of the present disclosure is to provide a button cell, including a housing and a cover plate assembly, the housing includes a bottom wall and an annular side wall, and a bottom end of the side wall is integrally formed with the bottom wall; the cover plate assembly includes a head cover, a conductive member and a conductive covering member, a through hole is disposed in a middle area of the head cover and is covered by the conductive member, and the conductive member is connected with the head cover in an insulated manner; an outer edge of the head cover is welded with a top end of the side wall to form an accommodating cavity for accommodating an electrode assembly and electrolyte; the conductive member has a liquid injection port for injecting the electrolyte into the accommodating cavity, and the conductive covering member convers the liquid injection port and is electrically connected with the conductive member.

The technical effect of one aspect of the present disclosure is that: the conductive member covers the through hole of the head cover, the head cover and the conductive member are connected together in an insulated and sealed manner through an insulating part, the electrode assembly is placed in the accommodating cavity, the head cover provided with the conductive member is hermetically connected with the housing, and finally the electrolyte is injected into the accommodating cavity from the liquid injection port in the conductive member. After the injection of electrolyte is completed, the conductive covering member covers the liquid injection port and is electrically connected with the conductive member, thereby improving the sealing performance of the button cell.

Another aspect of the present disclosure is to provide an electronic equipment, including an electronic equipment body and a button cell provided by one aspect of the present disclosure, the button cell providing electric energy for the electronic equipment body.

Another aspect of the present disclosure achieves the following technical effects: the electronic equipment of the embodiment adopts the button cell provided by one aspect of the present disclosure, so it has the beneficial effect brought by the button cell, that is, the button cell of the electronic equipment has stronger sealing performance.

REFERENCE NUMBERS

Figure 1:
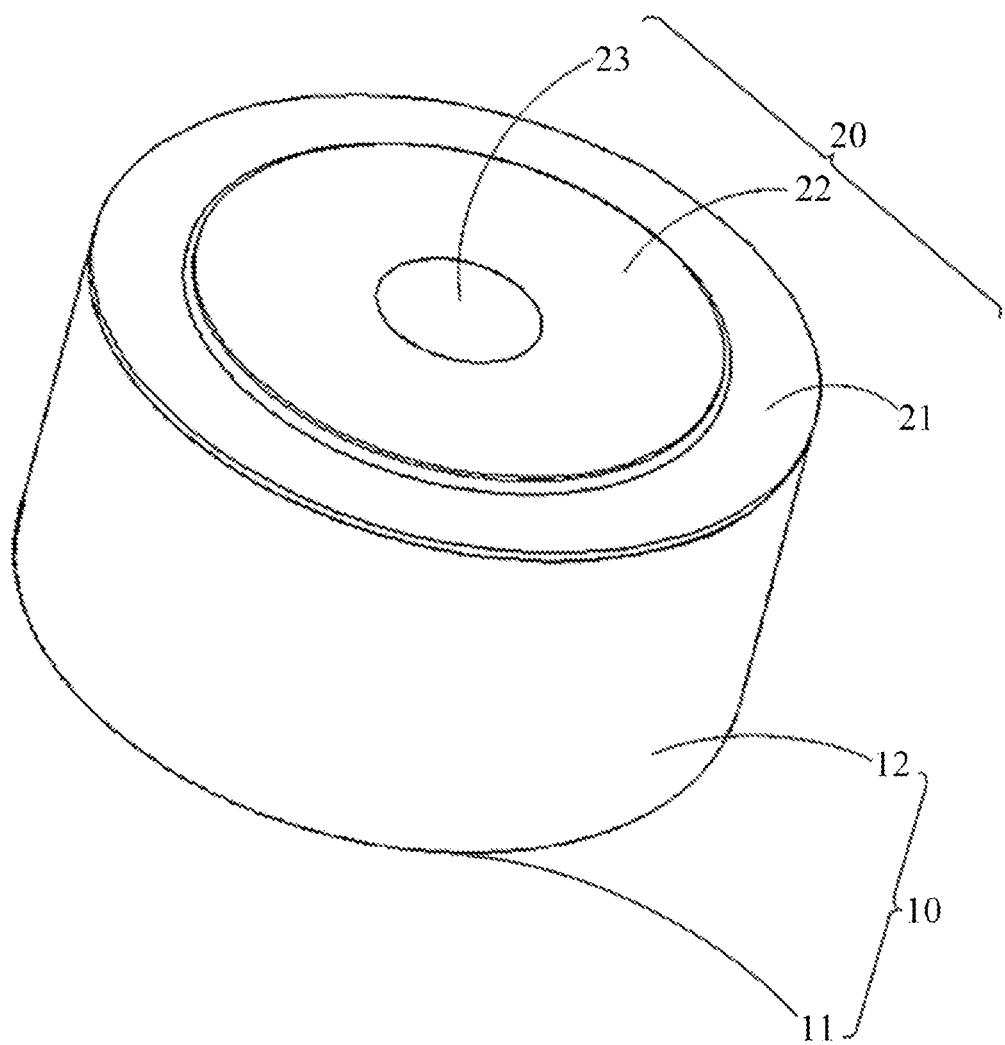
FIG. 1 is a structural schematic diagram of a button cell provided by Embodiment 1 of the present disclosure.

10: housing; 101: accommodating cavity; 11: bottom wall; 12: side wall;
20: cover plate assembly;
21: head cover; 2101: through hole; 211: first electrical connection portion; 212: first counter bore;
22: conductive member; 221: second electrical connection portion; 222: conductive member body; 2221: liquid injection port;
2222: second counter bore; 223: boss;
23: conductive covering member; 2301: thinning area; 231: third electrical connection portion; 232: conductive covering member body; 233: bending portion;
30: electrode assembly; 31: first tab; 32: second tab; 33: cavity;
40: insulating part;
50: butting piece.

DESCRIPTION OF EMBODIMENTS

Firstly, those skilled in the art should understand that these embodiments are only used to explain the technical principles of the present disclosure and not intended to limit the protection scope of the present disclosure. Those skilled in the art can adjust it according to needs in order to adapt to specific applications.

Secondly, it should be noted that in the description of the present disclosure, the terms indicating the direction or position relationship such as "inside" and "outside" are based on the direction or position relationship shown in the attached drawings, which is only for convenience of description, rather than indicating or implying that the equipment or component must have a specific orientation, or be constructed and operated in a specific orientation, therefore, it cannot be understood as a limitation of the present disclosure.

In addition, it should also be noted that in the description of the present disclosure, unless otherwise clearly specified and limited, the terms "connection" and "connected/connecting" should be understood in a broad sense. For example, such "connection" and "connected/connecting" may be fixed connection, removable connection, or integrated connection; or may be mechanical connection or electrical connection; or may be connected directly or indirectly through an intermediate medium, or may be the internal communication between the two components. For those skilled in the art, the specific meaning of the above terms in the present disclosure may be understood according to the specific circumstances.

Because the interior of the button cell belongs to a closed space, the sealing performance is very important for the button cell. In the related technology, an electrolyte is first injected into the accommodating cavity where the electrode assembly is placed, and then the conductive member is inserted into a through hole of the head cover, so that the conductive member is riveted with the through hole, and an insulating part is disposed between the conductive member and the through hole; however, when the conductive member is riveted with the through hole, the housing will vibrate, and the electrolyte in the accommodating cavity will splash to the insulating part, causing partial failure of the insulating part and poor sealing.

In order to solve the above problems, in the button cell provided by the embodiment of the present disclosure, the conductive member covers the through hole of the head cover, the head cover and the conductive member are connected together in an insulated and sealed manner through an insulating part, the electrode assembly is placed in the accommodating cavity of a bottom housing, and then the head cover with the conductive member is welded with the side wall of the housing. Finally, the head cover provided with the conductive member is hermetically connected with the housing, and the electrolyte is injected into the accommodating cavity from the liquid injection port of the conductive member. After the injection of electrolyte is completed, the conductive covering member covers the liquid injection port and is hermetically and electrically connected with the conductive member, so as to improve the sealing performance of the button cell.

In order to make the above purposes, features and advantages of the embodiment of the present disclosure more apparent and easy to understand, the technical solutions in the embodiment of the present disclosure will be clearly and completely described below in combination with the attached drawings in the embodiment of the present disclosure. Obviously, the described embodiments are only part of the embodiments of the present disclosure, not all of them. Based on the embodiments of the present disclosure, all other embodiments obtained by those skilled in the art without creative work fall within the protection scope of the present disclosure.

Embodiment 1

Figure 2:
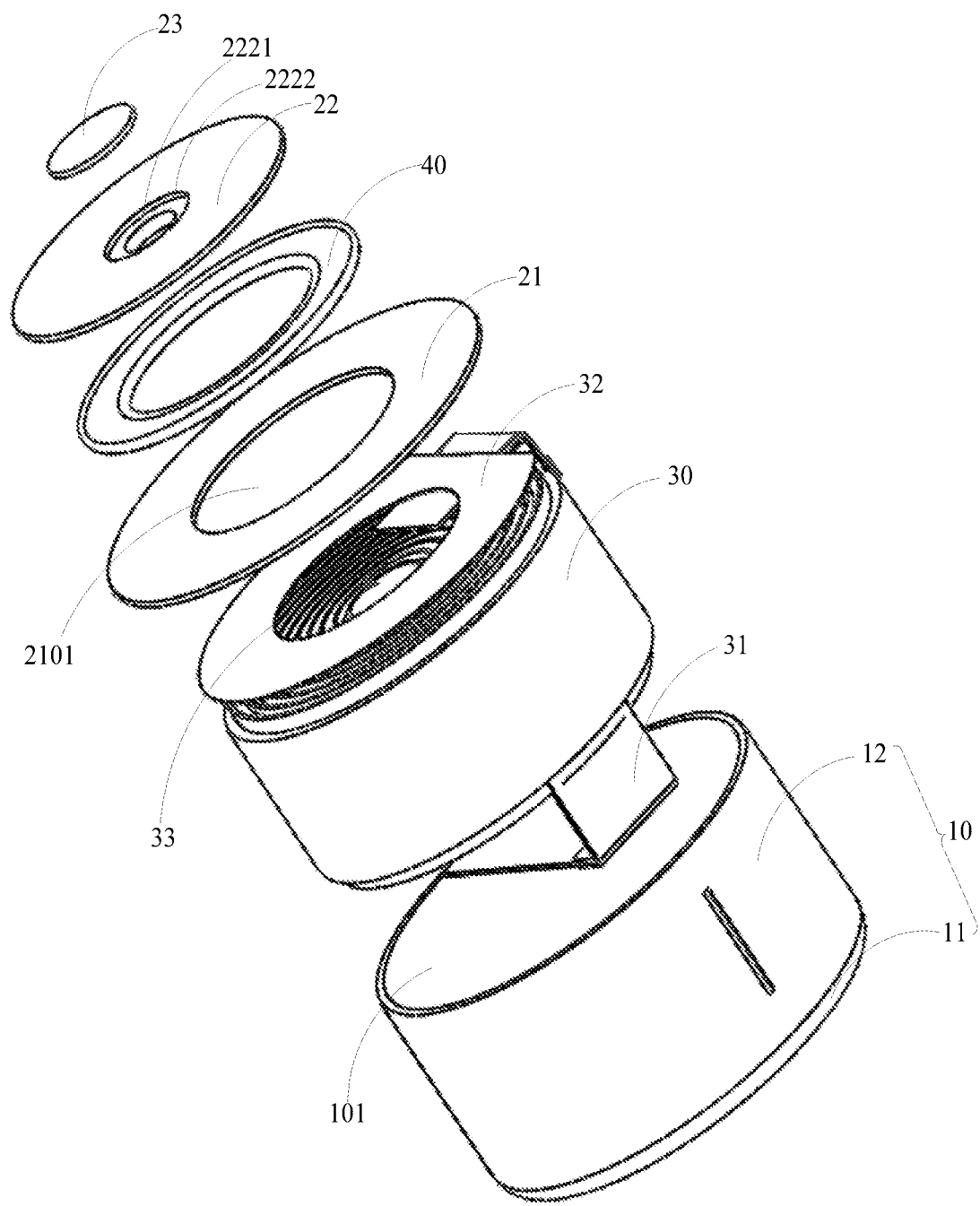
FIG. 2 is an exploded structural schematic diagram of the button cell provided in Embodiment 1 of the present disclosure.
Figure 3:
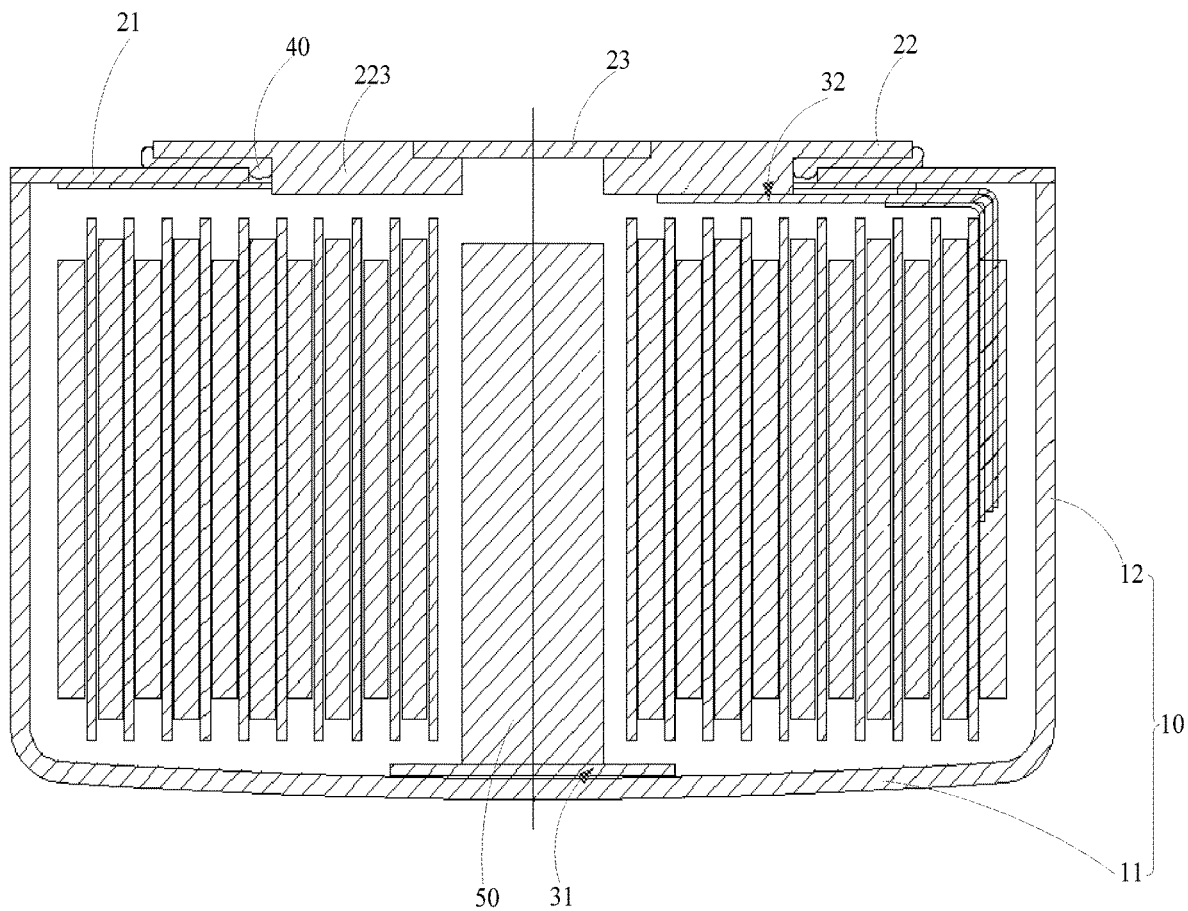
FIG. 3 is an internal structural schematic diagram of a first structure of the button cell provided in Embodiment 1 of the present disclosure.
Figure 4:
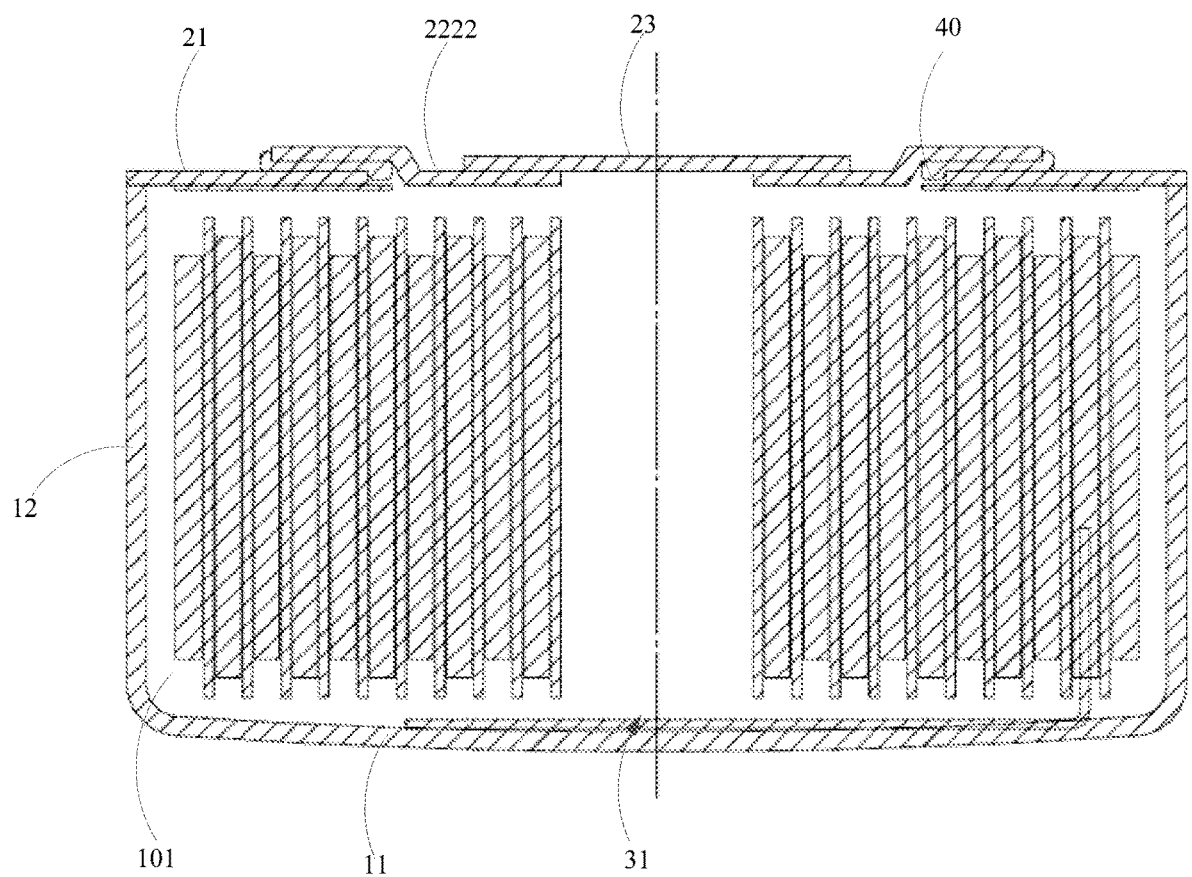
FIG. 4 is an internal structural schematic diagram of a second structure of the button cell provided in Embodiment 1 of the present disclosure.
Figure 5:
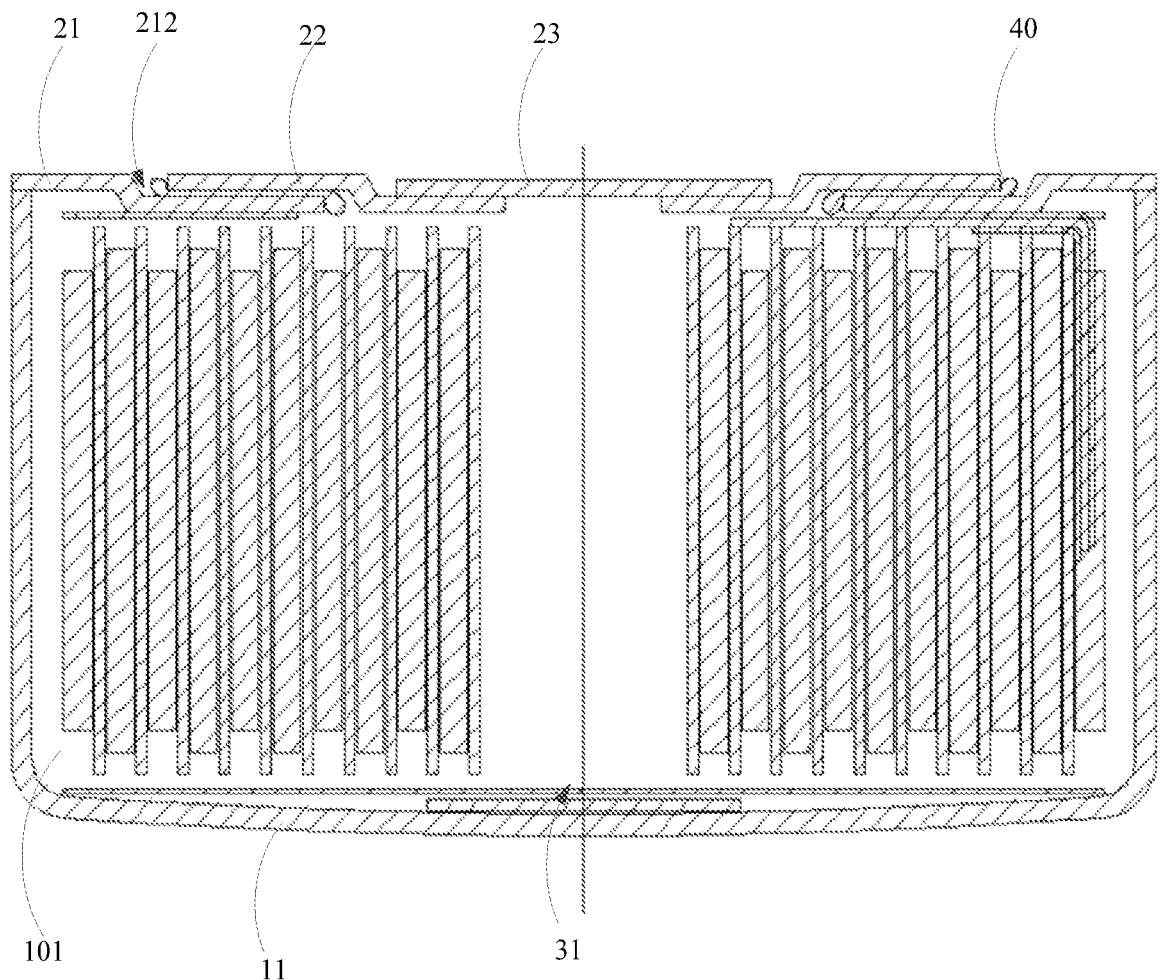
FIG. 5 is an internal structural schematic diagram of a third structure of the button cell provided in Embodiment 1 of the present disclosure.

FIG. 1 is a structural schematic diagram of a button cell provided by the embodiment; FIG. 2 is an exploded structural schematic diagram of a button cell provided by the embodiment; FIG. 3 is an internal structural schematic diagram of a first structure of the button cell provided by the embodiment; FIG. 4 is an internal structural schematic diagram of a second structure of the button cell provided by the embodiment; and FIG. 5 is an internal structural schematic diagram of a third structure of the button cell provided by the embodiment.

As shown in FIGS. 1-5, the button cell provided by this embodiment includes a housing 10 and a cover plate assembly 20. The housing 10 and the cover plate assembly 20 form an accommodating cavity 101, and an electrode assembly 30 is arranged inside the accommodating cavity 101. The cover plate assembly 20 includes a head cover 21, a conductive member 22 and a conductive covering member 23. The conductive member 22 is provided with a liquid injection port 2221 for injecting electrolyte into the accommodating cavity 101, and the conductive covering member 23 is configured to cover the liquid injection port 2221 and is hermetically connected with the liquid injection port 2221. The electrode assembly 30 is provided with a first tab 31 and a second tab 32, where, the first tab 31 is electrically connected with the housing 10 by welding, etc., and the second tab 32 is also electrically connected with the conductive member 22 by welding, bonding, etc. The button cell is electrically connected with the electronic equipment, so that the electrode assembly 30 provides electric energy for an electronic equipment through the housing 10 and the conductive member 22.

As shown in FIGS. 2-4, the housing 10 includes a bottom wall 11 and an annular side wall 12. The bottom wall 11, the side wall 12 and the head cover 21 of the cover plate assembly 20 form the accommodating cavity 101 for accommodating the electrode assembly 30. In order to improve the sealing performance, the head cover 21 and the side wall 12 are connected in a sealing manner. For example, the head cover 21 and the side wall 12 are welded and the like.

The shape of the radial section of the housing 10 may be any shape such as a circle, an ellipse, a polygon, etc., which is not limited in the embodiment. Exemplarily, the housing 10, the head cover 21 and the conductive member 22 may be made of metal material such as stainless steel, copper and iron.

A through hole 2101 is disposed in the head cover 21 to make the head cover 21 form a ring structure, the conductive member 22 covers the through hole 2101, and an insulating part 40 is arranged between the conductive member 22 and the through hole 2101, so that the conductive member 22 and the through hole 2101 are connected in an insulated and sealed manner via the insulating part 40. That is, the conductive member 22 is connected to the edge of the through hole 2101 via the insulating part 40, and covers the through hole 2101 of the head cover 21. The through hole 2101 may be in a shape of circle, ellipse, polygon, etc.

In order to improve the sealing performance of connection between the conductive member 22 and the head cover 21, the conductive member 22 may be bonded to the head cover 21 via the insulating part 40 by means of heating and pressuring. In this way, the bonding reliability of the insulating part 40 may be improved, thereby improving the sealing performance of the conductive member 22 connections with the head cover 21.

Further, the conductive member 22 may protrude beyond the surface of the head cover 21, or the head cover 21 may be provided with a first counter bore 212 for installing the conductive member 22. The conductive member 22 is located in the first counter bore 212. As shown in FIG. 5, the upper surface of the conductive member 22 is flush with the upper surface of the head cover 21. In the case that the conductive member 22 is connected with the head cover 21 through the insulating part 40 in an insulated and sealed manner, under heating and pressuring, glue overflow will occur to the insulating part 40. In this way, the glue overflowed is located in the first counter bore 212 and will not overflow the surface of the head cover 21. In this way, the surface of the head cover 21 is relatively flat, and the overall structure of the button cell is more compact, which improves the overall aesthetics of the button cell.

Exemplarily, the through hole 2101 is a circular hole, the conductive member 22 is in a shape of disc, and the diameter of the through hole 2101 is smaller than that of the conductive member 22. Therefore, the edge of the conductive member 22 and the edge of the through hole 2101 are at least partially overlapped in a radial direction, and the through hole 2101 and the conductive member 22 are tightly bonded by heating and pressurizing through the insulating part 40, which can allow a tighter connection between the through hole 2101 and the conductive member 22 under high heat and high pressure, thereby improving the sealing performance of the button cell.

With a larger unilateral overlapped part of the edge of the conductive member 22 and the edge of the through hole 2101 in a radial direction, the sealing performance is better. For example, the unilateral overlapped part of the conductive member 22 and the through hole 2101 in the radial direction is greater than or equal to 0.3 mm in size. In this way, the sealing area between the conductive member 22 and the through hole 2101 is increased, so that the sealing performance between the conductive member 22 and the through hole 2101 is improved.

Further, as shown in FIG. 3, the conductive member 22 is also provided with a boss 223 penetrating through the through hole 2101, and the boss 223 protrudes downward from the conductive member 22. For example, the conductive member 22 is formed as a T-shaped conductive member 22, so that the boss 223 and the hole wall of the through hole 2101 are hermetically connected through the insulating part 40. That is, the boss 223 is located in the through hole 2101 and an insulating part 40 is arranged between the boss 223 and the through hole 2101. Those skilled in the art can understand that, the conductive member 22 is provided with a downward projecting boss 223 and the boss 223 is located in the through hole 2101, which further increases the sealing area between the conductive member 22 and the through hole 2101, thereby improving the sealing performance between the conductive member 22 and the through hole 2101. The insulating part 40 may be made of soluble material, which improves the corrosion resistance to electrolyte and the sealing performance of the insulating part 40.

The insulating part 40 is annular. Upon heating and pressuring of the conductive member 22 and the head cover 21, the outer edge of the insulating part 40 overflows the joint between the conductive member 22 and the head cover 21, and the inner edge of the insulating part 40 overflows the joint between the insulating part 40 and the edge of the through hole 2101 of the head cover 21. In this way, the connection reliability of the insulating part 40 in connecting the conductive member 22 and the head cover 21 can be guaranteed.

FIG. 3 shows that the liquid injection port 2221 penetrates through the boss 223, which is provided with a counter bore for installing the conductive covering member 23.

As shown in FIG. 1 to FIG. 4, the conductive member 22 is also provided with a liquid injection port 2221 for injecting electrolyte into the accommodating cavity 101. The liquid injection port 2221 may be of any shape such as circle, quadrangle, polygon, etc. In one embodiment, the center of the liquid injection port 2221 is in the same line as the axis of the conductive member 22, and the conductive member 22 is concentric with the accommodating cavity 101 in the housing 10 for accommodating the electrode assembly 30.

In order to improve the sealing performance between the conductive covering member 23 and the liquid injection port 2221, the end of the liquid injection port 2221 away from the accommodating cavity 101 is provided with a second counter bore 2222, which is easy to understand that the second counter bore 2222 is configured to install the conductive covering member 23. The diameter of the second counter bore 2222 is larger than that of the liquid injection port 2221, and the second counter bore 2222 is communicated with and arranged to be coaxial with the liquid injection port 2221. The shape of the second counter bore 2222 is the same as that of the liquid injection port 2221, that is, when the liquid injection port 2221 is circular; the second counter bore 2222 is also circular. For example, the depth of the second counter bore 2222 may be between 0.01 mm and 0.5 mm.

The liquid injection port 2221 is covered with a conductive covering member 23, that is, the conductive covering member 23 is located in the second counter bore 2222. Due to the smaller depth of the second counter bore 2222, the conductive covering member 23 may be a sheet structure, and located in the second counter bore 2222 to cover the liquid injection port 2221. In order to improve the sealing performance, the conductive covering member 23 is hermetically connected with the liquid injection port 2221. For example, the conductive covering member 23 and the liquid injection port 2221 may be welded with each other, that is, after the electrolyte is injected into the accommodating cavity 101 through the liquid injection port 2221, the joint between the conductive covering member 23 and the second counter bore 2222 is subjected to welding outside the housing 10, so as to improve the sealing performance.

As shown in FIG. 4, in the case that the conductive covering member 23 and the liquid injection port 2221 are sealed by welding, in order to facilitate welding, the diameter of the second counter bore 2222 is larger than that of the conductive covering member 23, and the part of the conductive covering member 23 located in the second counter bore 2222 has a welding mark. That is, a welding to the joint between the conductive covering member 23 and the conductive member 22 may be performed in the second counter bore 2222 by a welding equipment. For example, the laser beam of a laser welding equipment may extend into the second counter bore 2222 to weld the conductive covering member 23 and the conductive member 22 together.

Optionally, the conductive covering member 23 may also be located in the second counter bore 2222 and bonded with the second counter bore 2222 by the insulating part 40 and the like, so as to simplify the operation process.

For example, the electrode assembly 30 is a winding-type electrode assembly 30. Specifically, the winding-type electrode assembly 30 includes a first plate, a second plate and a diaphragm for separating the first plate from the second plate; the first plate is provided with a first tab 31, which may be arranged on the first plate by means of welding, and the second plate is provided with a second tab 32, which may be arranged on the second plate by means of welding. During winding, the first plate, the second plate and the diaphragm are wound layer by layer in the same direction from the initial end of winding, and finally form the winding-type electrode assembly 30.

It can be understood that the first plate of the electrode assembly 30 may be a positive plate and the second plate may be a negative plate. At this time, the first tab 31 arranged on the first plate is a positive tab and the second tab 32 arranged on the second plate is a negative tab. In a specific implementation, the electrode assembly 30 is contained in the accommodating cavity 101, the positive tab is electrically connected with the bottom wall 11 of the housing 10 by means of welding, and the negative tab is electrically connected to the conductive member 22.

Optionally, the first plate of the electrode assembly 30 may be a negative plate, and the second plate may be a positive plate. At this time, the first tab 31 arranged on the first plate is a negative tab, and the second tab 32 arranged on the second plate is a positive tab. In a specific implementation, the electrode assembly 30 is arranged in the accommodating cavity 101, the negative tab is electrically connected with the bottom wall 11 of the housing 10 by means of welding, and the positive tab is electrically connected with the conductive member 22 so that the conductive member 22 is formed as the positive electrode of the button cell.

For example, the second tab 32 is electrically connected with the end of the boss 223 of conductive member 22 which extends into the accommodating cavity 101. In this way, the contact area between the second tab 32 and the conductive member 22 may be increased, so as to improve the reliability of the electrical connection. In order to prevent the head cover 21 from interfering with the connection between the second tab 32 and the boss 223, after the boss 223 extends into the accommodating cavity 101, one end of the boss 223 facing the accommodating cavity 101 exceeds the inner wall of the head cover 21. In this way, when the second tab 32 is connected with the end face of the boss 223, a gap is formed between the second tab 32 and the inner wall of the head cover 21; alternatively, an insulating layer is arranged between the inner wall of the head cover 21 and the second tab 32 to improve the reliability of the electrical connection between the second tab 32 and the conductive member 22.

It should be noted that the first tab 31 is electrically connected with the head cover 21 in the housing 10 by means of welding or bonding.

Optionally, in order to improve the reliability of the electrical connection of the first tab 31 and the second tab 32, an insulating layer may be disposed in the circumferential directions of the first tab 31 and the second tab 32, only exposing the part of the first tab 31 or the second tab 32 which is electrically connected with the bottom wall 11 of the housing 10 or the conductive member 22, respectively.

Optionally, the winding-type electrode assembly 30 may form a cavity 33 in its center during winding. When the electrode assembly 30 is placed in the accommodating cavity 101, the axis of the cavity 33 and the center line of the liquid injection port 2221 are located on the same line. In this way, when the electrolyte is injected into the accommodating cavity 101, the plates and diaphragm in the electrode assembly 30 will not block the injection of the electrolyte, so that the efficiency of electrolyte injection is improved, and the production efficiency of the button cell is enhanced.

For example, as shown in FIG. 3, the butting piece 50 may also be inserted from the liquid injection port 2221 into the cavity 33 of the electrode assembly 30. The butting piece 50 may be of a columnar structure, such as a cylinder, prism and other structures, may be composed of one columnar piece, or of two or more columnar parts connected from head to tail in sequence. When the first tab 31 is welded with the bottom wall 11 of the housing 10, the butting piece 50 is first inserted into the cavity 33 of the electrode assembly 30, so as to make a first end of the butting piece 50 butted to the first tab 31, and a pressure is applied on a second end of the butting piece 50 to make the first tab 31 tightly contact with the bottom wall 11 of the housing 10 through the extrusion of the butting piece 50, followed by welding. In this way, the reliability of welding between the first tab 31 and the bottom wall 11 of the housing 10 may be improved, so that the reliability of the electrical connection between the first tab 31 and the bottom wall 11 of the housing 10 is improved.

It should be noted that in order to facilitate the user's operation, the second end of the butting piece 50 may protrude out of the head cover 21 for the housing 10. After the welding of the first tab 31 of the button cell with the bottom wall 11 of the housing 10 is completed and the head cover 21 provided with the conductive member 22 is hermetically connected with the housing 10, the butting piece 50 may be taken out from the cavity 33 of the electrode assembly 30 along the liquid injection port 2221.

During welding, a vibration may occur. If the housing 10 and the head cover 21 are first hermetically connected and then the first tab 31 is welded with the bottom wall 11, the vibration will occur, resulting in an offset between the housing 10 and the head cover 21 and a dislocation between the housing 10 and the head cover 2, which causes loosening or failure of the sealed connection between the housing 10 and the head cover 21 and finally leads to bad sealing performance of the button electrode assembly 30. Therefore, in this embodiment, the electrode assembly 30 provided with the first tab 31 and the second tab 32 is first placed in the accommodating cavity 101, and the butting piece 50 is inserted into the cavity 33 of the electrode assembly 30. The first tab 31 is tightly contact with the bottom wall 11 under the extrusion of the butting piece 50, and then the bottom wall 11 and the first tab 31 are welded by a welding equipment to realize the electrical connection between the first tab 31 and bottom wall 11. Then, the head cover 21 that is provided with the conductive member 22 is connected in a sealed manner with the housing 10 by welding or bonding. Although the vibration occurs during welding between the housing 10 and the head cover 21, the problem of loose connection between the first tab 31 and the bottom wall 11 due to such vibration will not arise because the butting piece 50 is always butted to the first tab 31, which ensures the reliable connection between the first tab 31 and the bottom wall 11, improves the reliable sealing connection between the housing 10 and the head cover 21, and thus enhances the sealing performance of the button cell.

In a specific implementation, first, the head cover 21 and the conductive member 22 are connected together in an insulated and sealed manner via the insulating part 40 by means of heating and pressuring, and then the electrode assembly 30 is placed in the accommodating cavity 101 and the butting piece 50 is inserted into the cavity 33 of the electrode assembly 30. The first end of the butting piece 50 is butted on the first tab 31, and the second end of the butting piece 50 extends out of the head cover 21. Under the extrusion of the butting piece 50, the first tab 31 is tightly contact with the bottom wall of the housing 10. The first tab 31 is welded with the bottom wall 11 of the housing 10 through a welding equipment, and then the head cover 21 provided with the conductive member 22 covers the housing 10. The housing 10 and the head cover 21 are connected in a sealed manner by bonding or welding, and the second tab 32 of the electrode assembly 30 is electrically connected with the conductive member 22. Upon the removal of the butting piece 50, the electrolyte is injected into the accommodating cavity 101 from the liquid injection port 2221. After the injection of electrolyte is completed, the liquid injection port 2221 is covered by the conductive covering member 23, and the conductive covering member 23 is hermetically connected with the liquid injection port 2221 by bonding or welding.

Embodiment 2

On the basis of Embodiment 1, the button cell provided in this embodiment is to solve the problem that the existing button cell needs to weld two conductive sheets on the positive and negative electrode sides prior to being installed in the electrical equipment, so that the positive and negative electrodes of the button cell are connected with the positive and negative electrodes of the electronic equipment to form a conductive circuit, respectively. The button cell is welded with two conductive sheets, which will increase the manufacturing cost of button cell.

Figure 6:
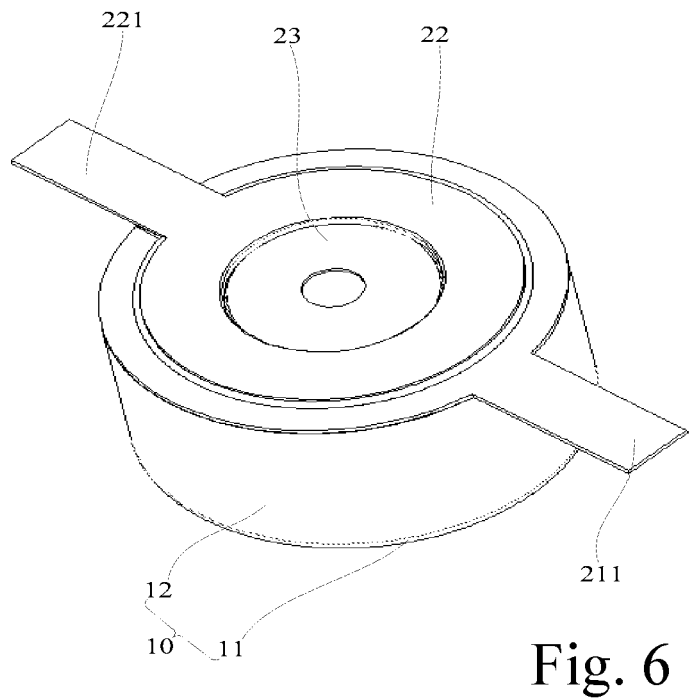
FIG. 6 is a schematic diagram of a first structure of the button cell provided in Embodiment 2 of the present disclosure.
Figure 7:
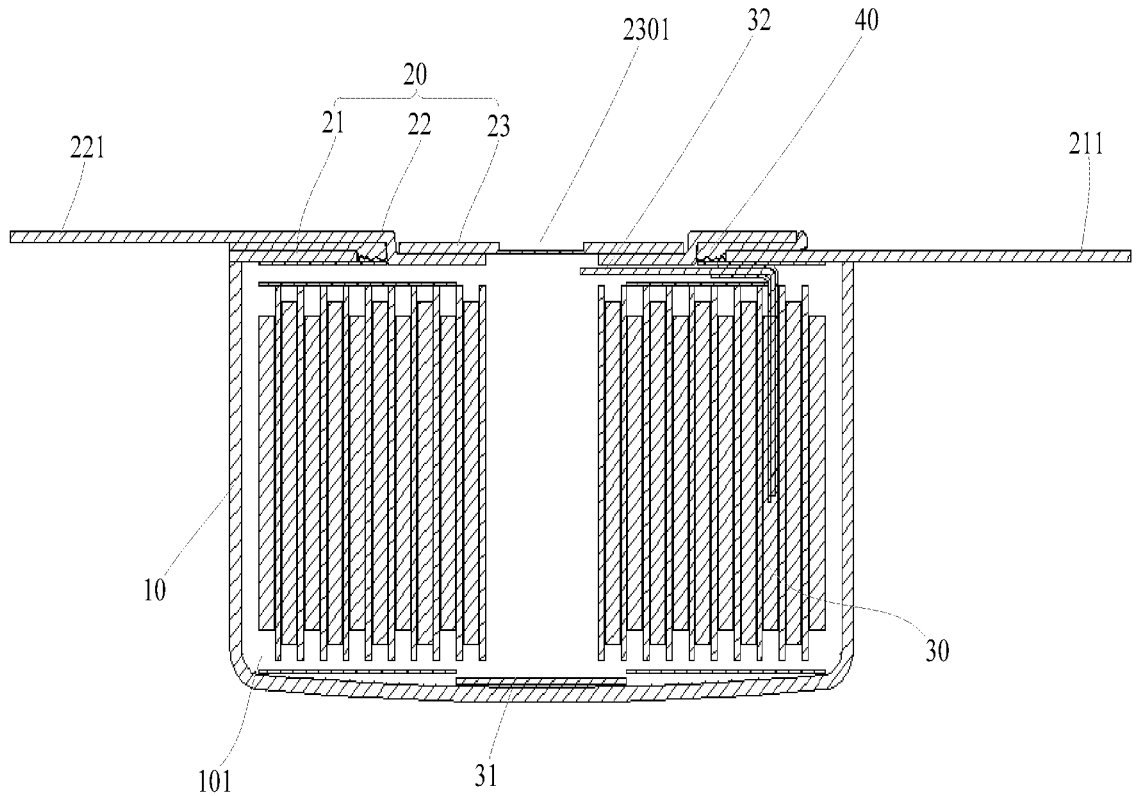
FIG. 7 is a schematic diagram of cross-sectional structure of the button cell showed in FIG. 6.
Figure 8:
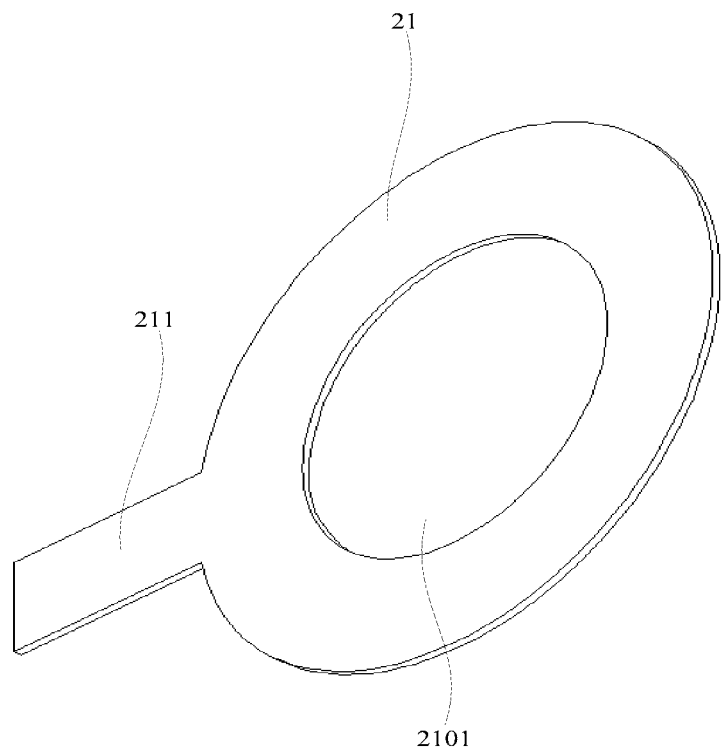
FIG. 8 is a structural schematic diagram of the head cover in FIG. 6.
Figure 9:
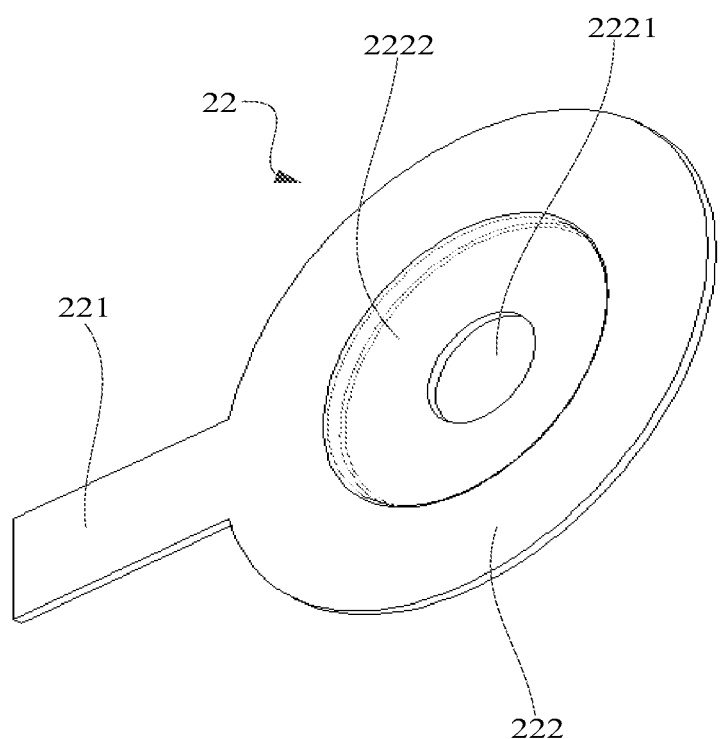
FIG. 9 is a structural schematic diagram of the conductive member in FIG. 6.
Figure 10:
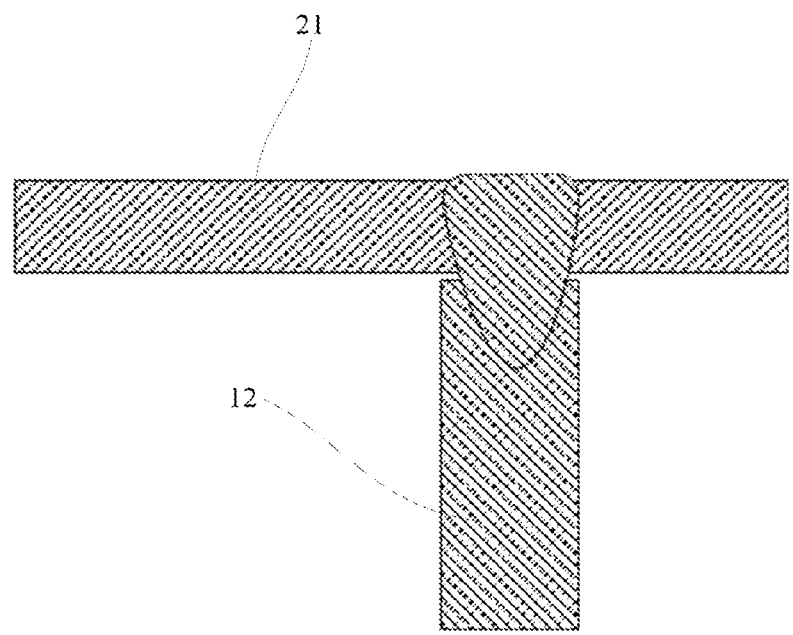
FIG. 10 is a schematic diagram of a welding structure of the head cover and the side wall in FIG. 6.

FIG. 6 is the schematic diagram of first structure of the button cell provided in Embodiment 2 of the present disclosure; FIG. 7 is the schematic diagram of cross-sectional structure of the button cell shown in FIG. 6; FIG. 8 is the structural schematic diagram of the head cover in FIG. 6; FIG. 9 is the structural schematic diagram of the conductive member in FIG. 6; FIG. 10 is the schematic diagram of a welding structure of the head cover and the side wall in FIG. 6.

As shown in FIGS. 6-10, the button cell, the bottom end of the side wall 12 and the bottom wall 11 provided by this embodiment are integrally formed. The head cover 21 is provided with a first electrical connection portion 211 which is integrally formed with the head cover 21, and the first electrical connection portion 211 protrudes beyond the side wall 12.

The first electrical connection portion 211 is integrally formed with the head cover 21. The electrode assembly 30 may provide electric energy for the negative or positive electrode of the electronic equipment through the head cover 21 and the first electrical connection portion 211. Therefore, the head cover 21 and the first electrical connection portion 211 may be made of metal material such as stainless steel, copper, iron, and nickel. The shape of the first electrical connection portion 211 may be designed according to the actual needs of the electronic equipment.

In order to facilitate the connection of the first electrical connection portion with the electronic equipment, the upper surface of the first electrical connection portion 211 is not lower than that of the head cover 21. In other implementations, the upper surface of the first electrical connection portion 211 may also be lower than that of the head cover 21, which is not specifically defined here.

In an optional embodiment, the electrode assembly 30 supplies electric energy to the negative electrode of the electronic equipment through the head cover 21 and the first electrical connection portion 211. The first electrical connection portion 211 is a rectangular nickel plate, with a width of 1 mm-3 mm. The length of the first electrical connection portion 211 protruding beyond the side wall 12 is greater than 1 mm, and the thickness of the first electrical connection portion 211 in the width direction is the same as that of the head cover 21. The first electrical connection portion 211 is located in the same plane as the head cover 21, and the first electrical connection portion 211 protrudes beyond the side wall 12.

In the button cell provided by this embodiment, the head cover 21 is arranged integrally with the first electrical connection portion 211, which eliminates the need for the existing button cell to weld the conductive sheet on the head cover before being installed on the electronic equipment, thereby reducing the manufacturing cost of the button cell.

Optionally, the conductive member 22 is provided with a second electrical connection portion 221, which is integrally arranged with the conductive member 22 and extends beyond the side wall 12, and/or the conductive covering member 23 is provided with a third electrical connection portion 231, which is integrally arranged with the conductive covering member 23 and extends beyond the side wall 12. The first electrical connection portion 211 and the second electrical connection portion 221 carry opposite charges, while the second electrical connection portion 221 and the third electrical connection portion 231 carry identical charges.

The conductive member 22 includes a conductive member body 222 and the second electrical connection portion 221, which are integrally formed, and the second electrical connection portion 221 is parallel to the first electrical connection portion 211.

In order to facilitate the connection of the second electrical connection portion 221 with the electronic equipment, the upper surface of the second electrical connection portion 211 may not be lower than that of the conductive member body 222, and the upper surface of the second electrical connection portion 221 is higher than that of the first electrical connection portion 211. In other implementations, the upper surface of the second electrical connection portion 211 may also be lower than that of the conductive member body 222, and the upper surface of the second electrical connection portion 221 is higher than that of the first electrical connection portion 211, which is not specifically defined here.

The conductive member body 222 covers the through hole 2101, and an insulating part 40 is arranged between the conductive member body 222 and the through hole 2101. The insulating part 40 allows the conductive member body 222 and the through hole 2101 to be connected in an insulated and sealed manner.

The insulating part 40 may be an insulating glue or a ceramic layer, which is not specifically defined here.

In an optional embodiment, the electrode assembly 30 supplies electric energy to the positive electrode of the electronic equipment through the conductive member body 222 and the second electrical connection portion 221. The second electrical connection portion 221 is a rectangular aluminum plate. The width of the second electrical connection portion 221 protruding beyond the side wall 12 is 1 mm-3 mm, the length of the second electrical connection portion 221 is greater than 1 mm, and the second electrical connection portion 221 is parallel to the first electrical connection portion 211.

It should be noted that the second electrical connection portion 221 may also be an aluminum nickel composite sheet, in which the aluminum nickel composite sheet has a two-layer structure, one layer of nickel and the other layer of aluminum, and the thickness ratio of two layers is between 1:0.9 and 1:1.1, or between 2:0.9 and 2:1.1.

The conductive covering member 23 includes a conductive covering member body 232 and a third electrical connection portion 231. The conductive covering member body 232 and the third electrical connection portion 231 are arranged integrally, and the third electrical connection portion 231 is parallel to the first electrical connection portion 211.

The conductive covering member body 232 covers the liquid injection port 2221, and the conductive covering member 23 is hermetically connected with the liquid injection port 2221.

The third electrical connection portion 231 is integrally formed with the conductive covering member body 232. Since the electrode assembly 30 supplies electric energy to the negative or positive electrode of the electronic equipment through the conductive covering member body 232 and the third electrical connection portion 231, the conductive covering member body 232 and the third electrical connection portion 231 may be made of metal material such as stainless steel, copper, iron and nickel. The shape of the third electrical connection portion 231 may be designed according to the actual needs of the electronic equipment.

In order to facilitate the connection of the third electrical connection portion 231 with the electronic equipment, the upper surface of the third electrical connection portion 231 may be higher than that of the first electrical connection portion. In other implementations, the upper surface of the third electrical connection portion 231 may not be higher than that of the first electrical connection portion, which is not specifically defined here.

An insulating part 40 is arranged between the third electrical connection portion 231 and the first electrical connection portion 211 to allow the third electrical connection portion 231 and the first electrical connection portion 211 to be connected in an insulated and sealed manner.

In an optional embodiment, the electrode assembly 30 supplies electric energy to the positive electrode of the electronic equipment through the conductive covering member body 232 and the third electrical connection portion 231. The third electrical connection portion 231 is a rectangular aluminum plate. The width of the third electrical connection portion 231 protruding beyond the side wall 12 is 1 mm-3 mm, the length of the third electrical connection portion 231 is greater than 1 mm, and the third electrical connection portion 231 is parallel to the first electrical connection portion 211.

It should be noted that the button cell may be configured in such a way that the head cover 21 is provided with a first electrical connection portion 211 which is integrally arranged with the head cover 21, the conductive member 22 is provided with a second electrical connection portion 221 which is integrally arranged with the conductive member 22, the conductive covering member 23 is not provided with a third electrical connection portion 231 which is integrally arranged with the conductive covering member 23, and the first electrical connection portion 211 and the second electrical connection portion 221 carry opposite charges. The button cell may also be configured in such a way that the head cover 21 is provided with the first electrical connection portion 211 which is integrally arranged with the head cover 21, the conductive covering member 23 is provided with a third electrical connection portion 231 which is integrally arranged with the conductive covering member 23, the conductive member 22 is not provided with a second electrical connection portion 221 which is integrally arranged with the conductive member 22, and the first electrical connection portion 211 and the third electrical connection portion 231 carry opposite charges, at this time, the conductive member 22 is welded with the conductive covering member 23. The button cell may also be configured in such a way that the head cover 21 is provided with a first electrical connection portion 211 which is integrally arranged with the head cover 21, the conductive member 22 is provided with a second electrical connection portion 221 which is integrally arranged with the conductive member 22, the conductive covering member 23 is provided with a third electrical connection portion 231 which is integrally arranged with the conductive covering member 23, the first electrical connection portion 211 and the second electrical connection portion 221 carry opposite charges, and the second electrical connection portion 221 and the third electrical connection portion 231 carry identical charges; at this time, the conductive member 22 is welded with the conductive covering member 23, which is not specifically defined here.

In the button cell provided by the embodiment, the head cover is provided with a first electrical connection portion which is integrally arranged with the head cover; the conductive member is provided with a second electrical connection portion which is integrally arranged with the conductive member, and/or the conductive covering member is provided with a third electrical connection portion which is integrally arranged with the conductive covering member, which eliminates the need for the existing button cell to weld two conductive sheets on the positive and negative sides before being installed in the electronic equipment, thereby reducing the manufacturing cost of the button cell.

Optionally, the included angle between the protruding direction of the first electrical connection portion 211 and the protruding direction of the second electrical connection portion 221 is not less than 90°; and/or, the included angle between the protruding direction of the first electrical connection portion 211 and the protruding direction of the third electrical connection portion 231 is not less than 90°, which may make the overall structural distribution of the button cell more uniform and improve the overall aesthetics of the button cell.

As shown in FIG. 10, optionally, in order to improve the safety of the button cell, the outer edge of the head cover 21 is welded with the top end of the side wall 12, the outer surface of the outer edge of the head cover 21 has a welding mark, and the welding penetration extends from the head cover 21 to the side wall 12. In other implementations, the head cover 21 and the side wall 12 may also be connected by bonding, which is not specifically defined here.

Optionally, in order that the button cell can output a plurality of circuits, there is a plurality of the first electrical connection portion 211, which are arranged at intervals along the side of the head cover 21; there is a plurality of the second electrical connecting part 221, which are arranged at intervals along the side of the conductive member body 222; or, there is a plurality of the third electrical connection portion 231, which are arranged at intervals along the side of the conductive covering member body 232, thereby improving the applicability of the button cell.

Optionally, the conductive covering member 23 is not provided with a third electrical connection portion 231 which is integrally arranged with the conductive covering member 23, the conductive member 22 is arranged on the side of the head cover 21 away from the accommodating cavity 101, an insulating part 40 is arranged between the second electrical connection portion 221 and the head cover 21, the second electrical connection portion 221 protrudes beyond the side wall 12, and the conductive member body 222 is provided with a second counter bore 2222, the center of which coincides with that of the liquid injection port 2221; the conductive covering member 23 is arranged in the second counter bore.

Specifically, the conductive member 22 includes a conductive member body 222 and a second electrical connection portion 221. The conductive member body 222 and the second electrical connection portion 221 are arranged integrally, and the second electrical connection portion 221 is parallel to the head cover 21. In order to improve the sealing performance between the conductive covering member 23 and the liquid injection port 2221, one end of the conductive member body 222 away from the accommodating cavity 101 is provided with a second counter bore 2222, the center of which coincides with that of the liquid injection port 2221.

The insulating part 40 enables the conductive member body 222 and the through hole 2101 to be connected in an insulated and sealed manner, that is, the conductive member body 222 is bonded to the edge of the through hole 2101 via the insulating part 40, and covers the through hole 2101 in the head cover 21. The second electrical connection portion 221 is flush with the end face of one end of the conductive member body 222 away from the accommodating cavity 101, and the insulating part 40 is arranged between the second electrical connection portion 221 and the first electrical connection portion 211, that is, an insulating part 40 is arranged between the second electrical connection portion 221 and the head cover 21. Among them, the shape of the second counter bore 2222 is the same as that of the liquid injection port 2221, that is, when the shape of the liquid injection port 2221 is circular; the shape of the second counter bore 2222 is also circular.

The liquid injection port 2221 is covered with a conductive covering member 23, that is, the conductive covering member 23 is located in the second counter bore 2222. Due to the smaller depth of the second counter bore 2222, the conductive covering member 23 may be a sheet structure, which is located in the second counter bore 2222 to cover the liquid injection port 2221. In order to improve the sealing performance, the conductive covering member 23 is connected with the liquid injection port 2221 in an airtight manner. For example, the conductive covering member 23 and the liquid injection port 2221 may be welded together, that is, after the electrolyte is injected into the accommodating cavity 101 through the liquid injection port 2221, the joint between the conductive covering member 23 and the second counter bore 2222 is welded on the outside of the head cover 21, so as to improve the sealing performance.

Figure 11:
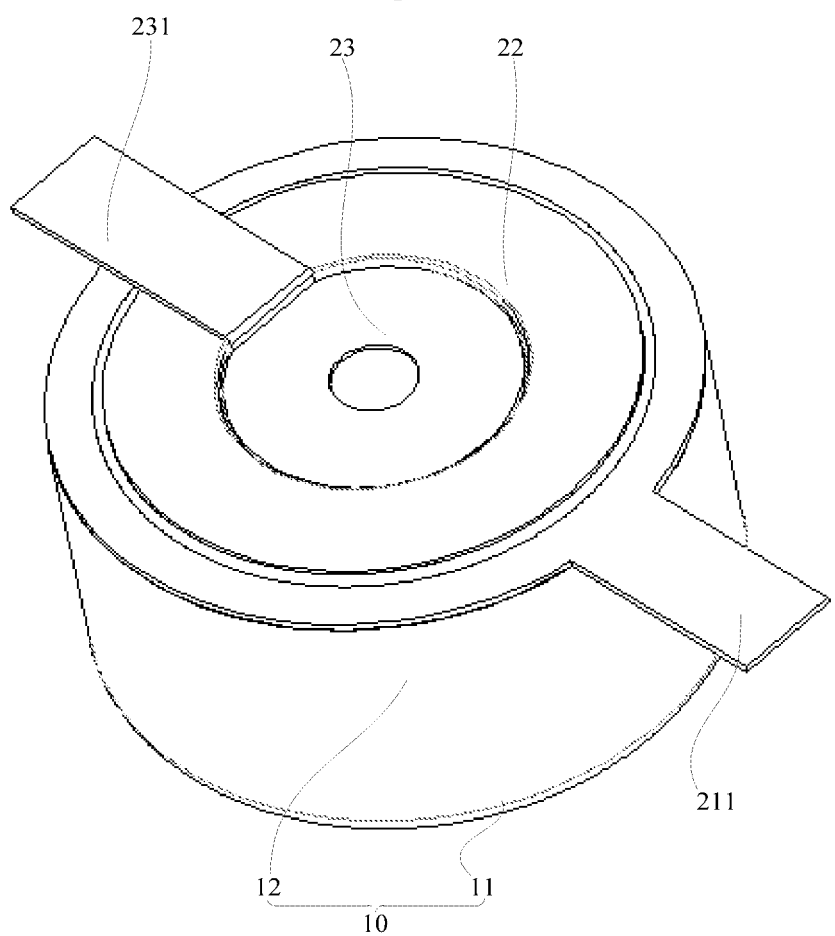
FIG. 11 is a schematic diagram of a second structure of the button cell provided in Embodiment 2 of the present disclosure.
Figure 12:
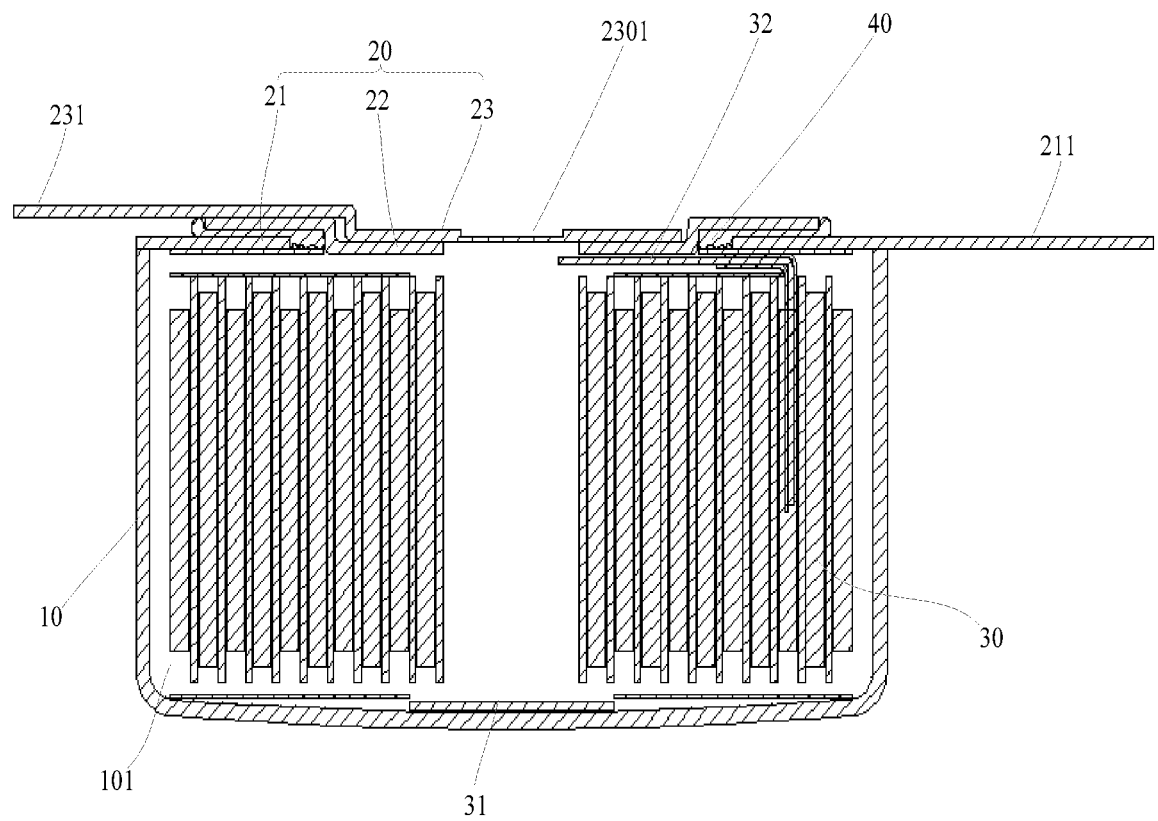
FIG. 12 is a schematic diagram of cross-sectional structure of the button cell showed in FIG. 11.
Figure 13:
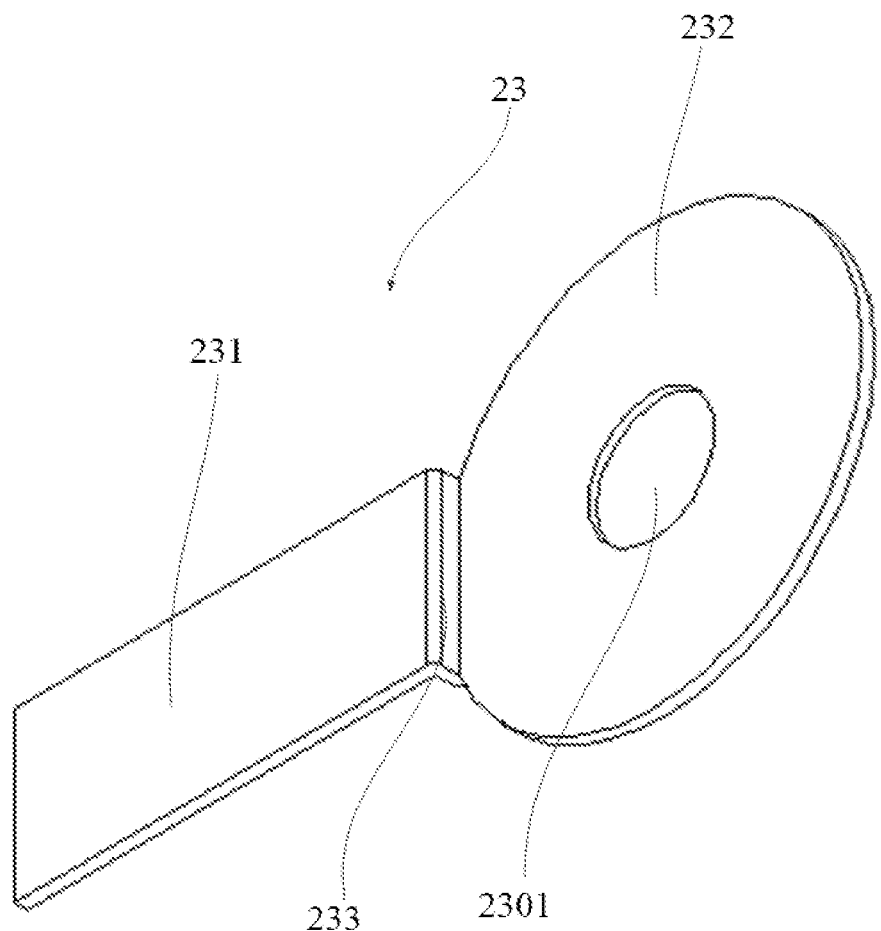
FIG. 13 is a structural schematic diagram of the conductive covering member in FIG. 11.
Figure 14:
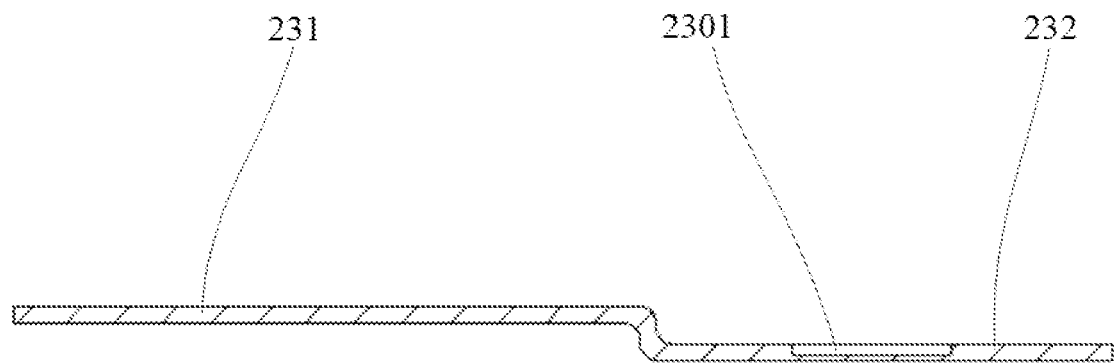
FIG. 14 is a schematic diagram of cross-sectional structure of the conductive covering member in FIG. 13.
Figure 15:
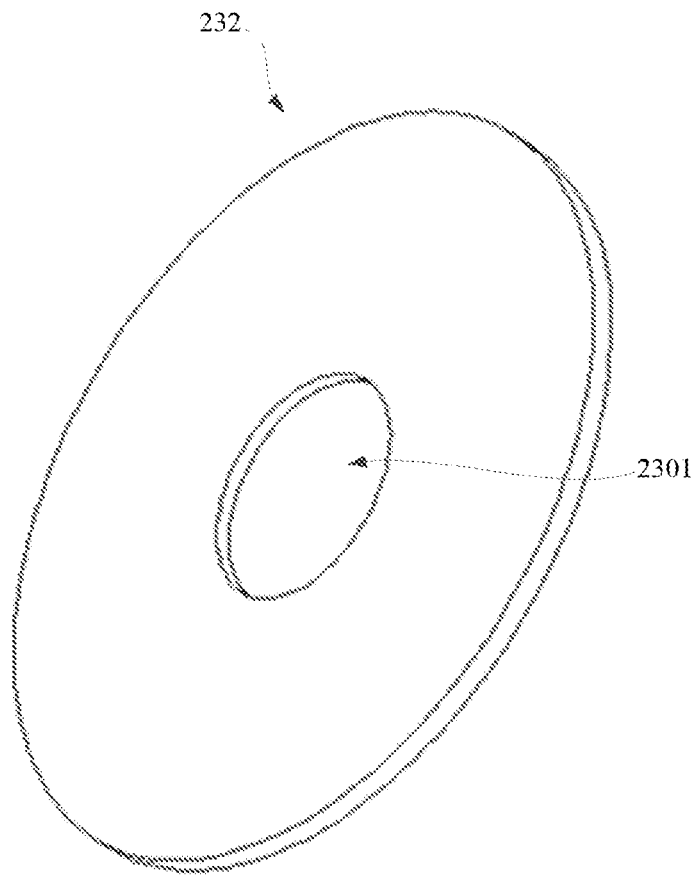
FIG. 15 is schematic diagram of a first structure of the body of conductive covering member in FIG. 13.
Figure 16:
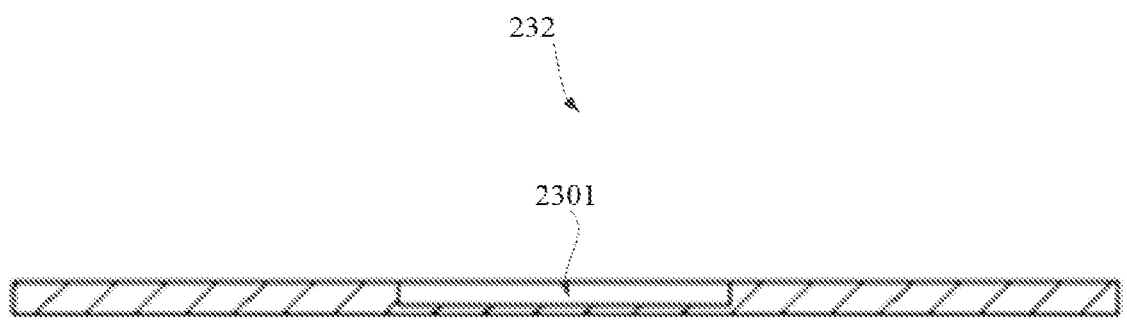
FIG. 16 is a schematic diagram of cross-sectional structure of the conductive covering member body in FIG. 15.
Figure 17:
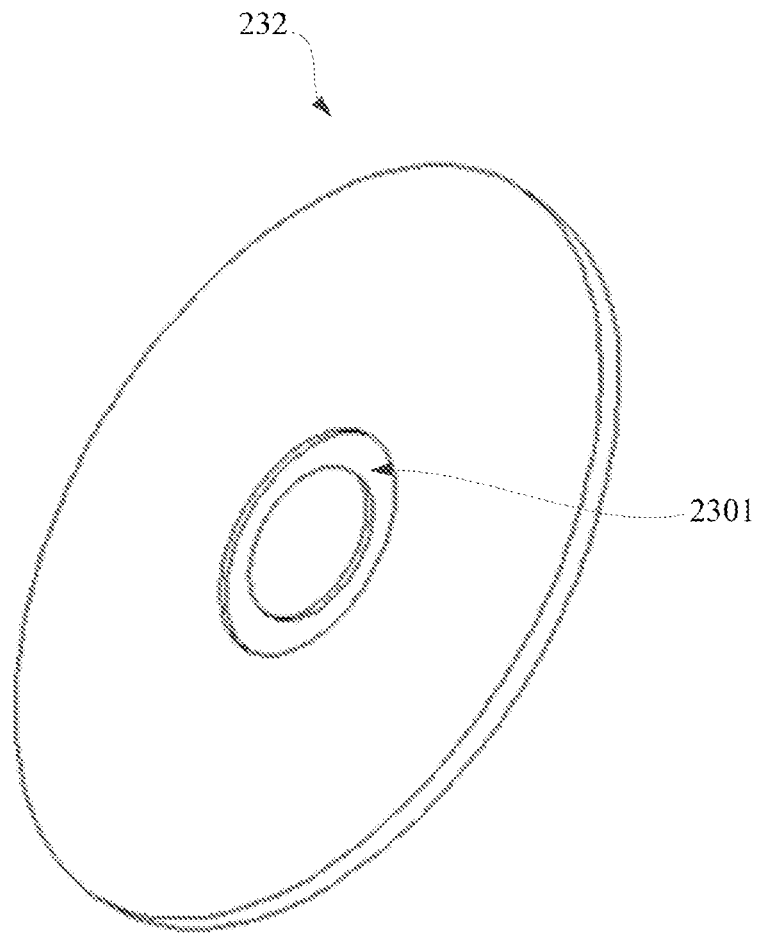
FIG. 17 is a schematic diagram of a second structure of the conductive covering member body in FIG. 13.
Figure 18:
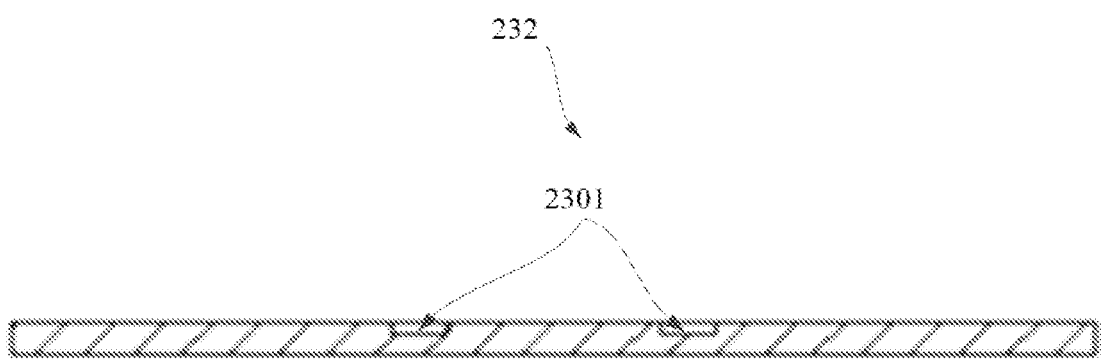
FIG. 18 is a schematic diagram of cross-sectional structure of the conductive covering member body in FIG. 17.
Figure 19:
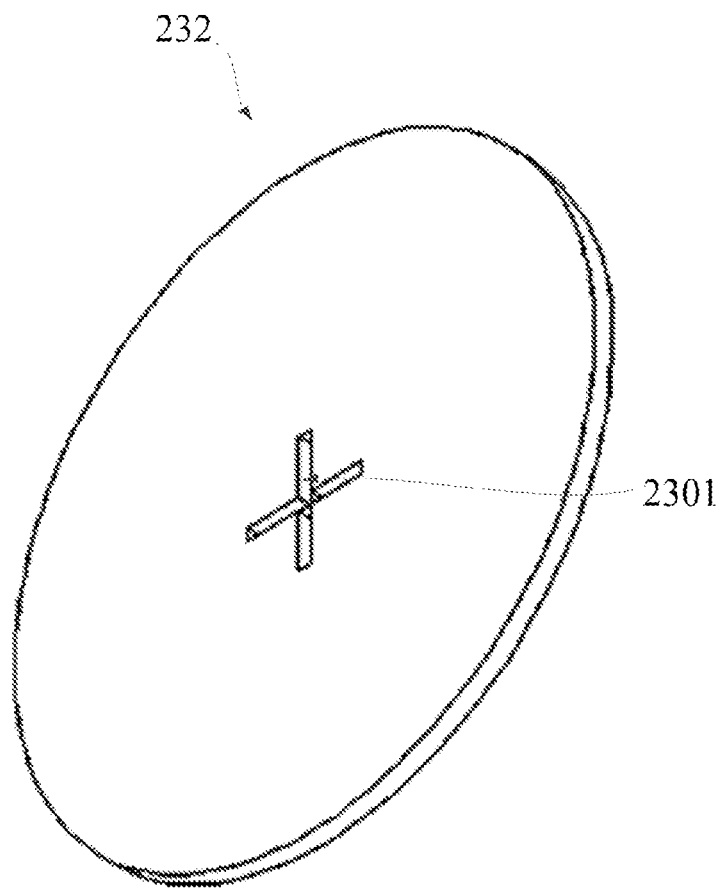
FIG. 19 is a schematic diagram of a third structure of the conductive covering member body in FIG. 13.
Figure 20:
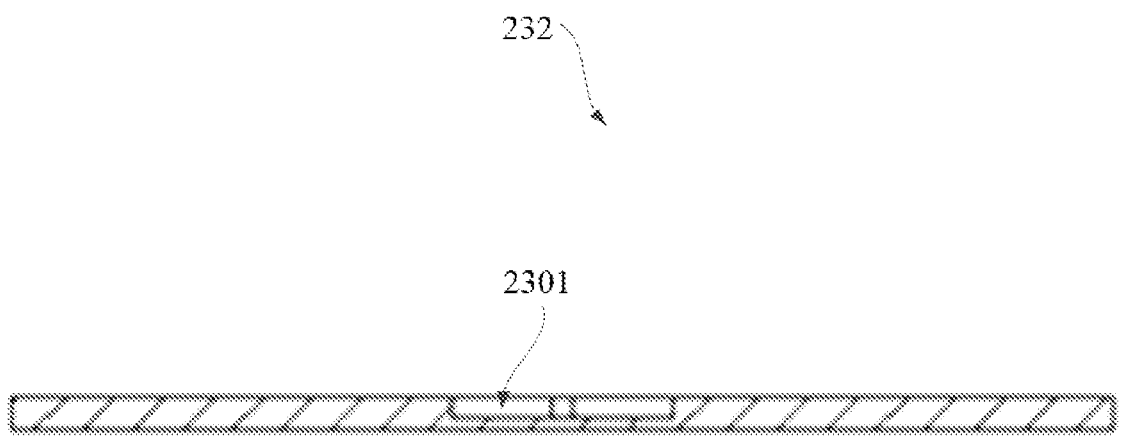
FIG. 20 is a schematic diagram of cross-sectional structure of the conductive covering member body in FIG. 19.
Figure 21:
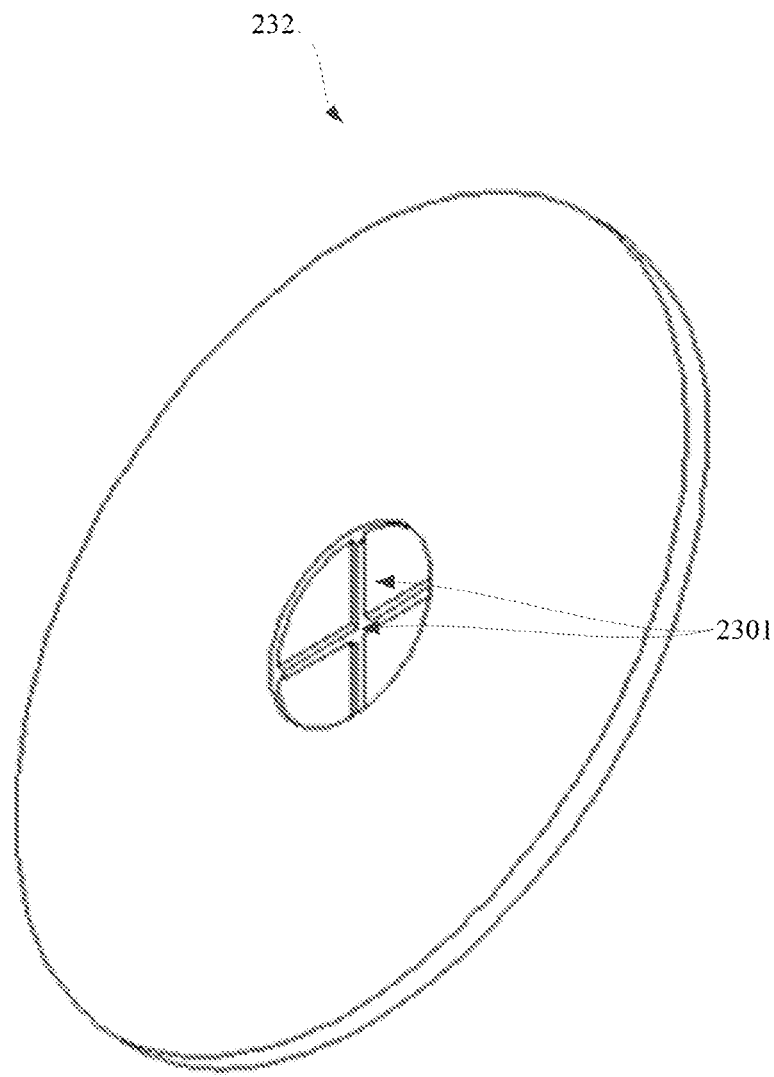
FIG. 21 is a schematic diagram of a fourth structure of the conductive covering member body in FIG. 13.
Figure 22:
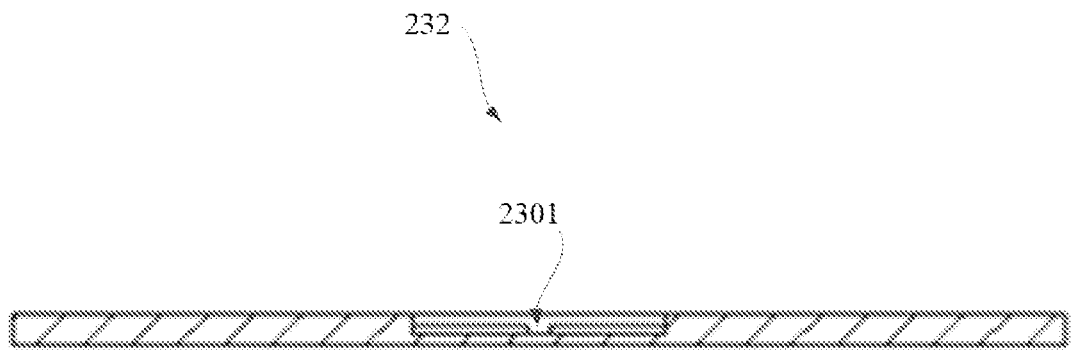
FIG. 22 is a schematic diagram of cross-sectional structure of the conductive covering member body in FIG. 21.

FIG. 11 is the schematic diagram of a second structure of the button cell provided by the embodiment; FIG. 12 is the schematic diagram of cross-sectional structure of the button cell shown in FIG. 11; FIG. 13 is the structural schematic diagram of the conductive covering member in FIG. 11; FIG. 14 is the schematic diagram of cross-sectional structure of the conductive covering member in FIG. 13; FIG. 15 is the schematic diagram of a first structure of the conductive covering member body in FIG. 13; FIG. 16 is the schematic diagram of cross-sectional structure of the conductive covering member body in FIG. 15; FIG. 17 is the schematic diagram of a second structure of the conductive covering member body in FIG. 13; FIG. 18 is the schematic diagram of cross-sectional structure of the conductive covering member body in FIG. 17; FIG. 19 is the schematic diagram of a third structure of the conductive covering member body in FIG. 13; FIG. 20 is the schematic diagram of cross-sectional structure of the conductive covering member body in FIG. 19; FIG. 21 is the schematic diagram of a fourth structure of the conductive covering member body in FIG. 13; and FIG. 22 is the schematic diagram of cross-sectional structure of the conductive covering member body in FIG. 21.

Optionally, the conductive member 22 is not provided with a second electrical connection portion 221 which is integrally arranged with the conductive member 22, the conductive member 22 is arranged on the side of the head cover 21 away from the accommodating cavity 101, and an insulating part 40 is arranged between the conductive member 22 and the head cover 21.

In order to improve the sealing performance between the conductive covering member 23 and the liquid injection port 2221, a second counter bore 2222 is arranged at one end of the conductive member body 222 away from the accommodating cavity 101, and the center of the second counter bore 2222 coincides with that of the liquid injection port 2221. The shape of the second counter bore 2222 is the same as that of the liquid injection port 2221, that is, when the shape of the liquid injection port 2221 is circular; the shape of the second counter bore 2222 is also circular. For example, the depth of the second counter bore 2222 may be between 0.05 mm and 0.45 mm.

The conductive covering member 23 includes a conductive covering member body 232, a third electrical connection portion 231 and a bending portion 233. The bending portion 233 is arranged between the conductive covering member body 232 and the third electrical connection portion 231. Both the conductive covering member body 232 and the third electrical connection portion 231 are perpendicular to the bending portion 233. The conductive covering member body 232, the third electrical connection portion 231 and the bending portion 233 are integrally formed. Due to the smaller depth of the second counter bore 2222, the conductive covering member body 232 may be a sheet structure, which is located in the second counter bore 2222 to cover the liquid injection port 2221. In order to improve the sealing performance, the conductive covering member body 232 is connected with the liquid injection port 2221 in a sealed manner.

The third electrical connection portion 231 is arranged in parallel with the first electrical connection portion 211. Among them, the shape of the conductive covering member body 232 is the same as that of the liquid injection port 2221, that is, when the shape of the liquid injection port 2221 is circular; the shape of the conductive covering member body 232 is also circular. For example, the distance between the conductive covering member body 232 and the third electrical connection portion 231 in a vertical direction may be 0.1 mm-0.5 mm, that is, the height of the bending portion is 0.1 mm-0.5 mm.

It should be noted that in order to improve the insulating effect between the third electrical connection portion 231 and the first electrical connection portion 211, there is an insulated and sealed connection between the third electrical connection portion 231 and the first electrical connection portion 211, that is, an insulating part 40 is arranged between the third electrical connection portion 231 and the head cover 21.

Figure 23:
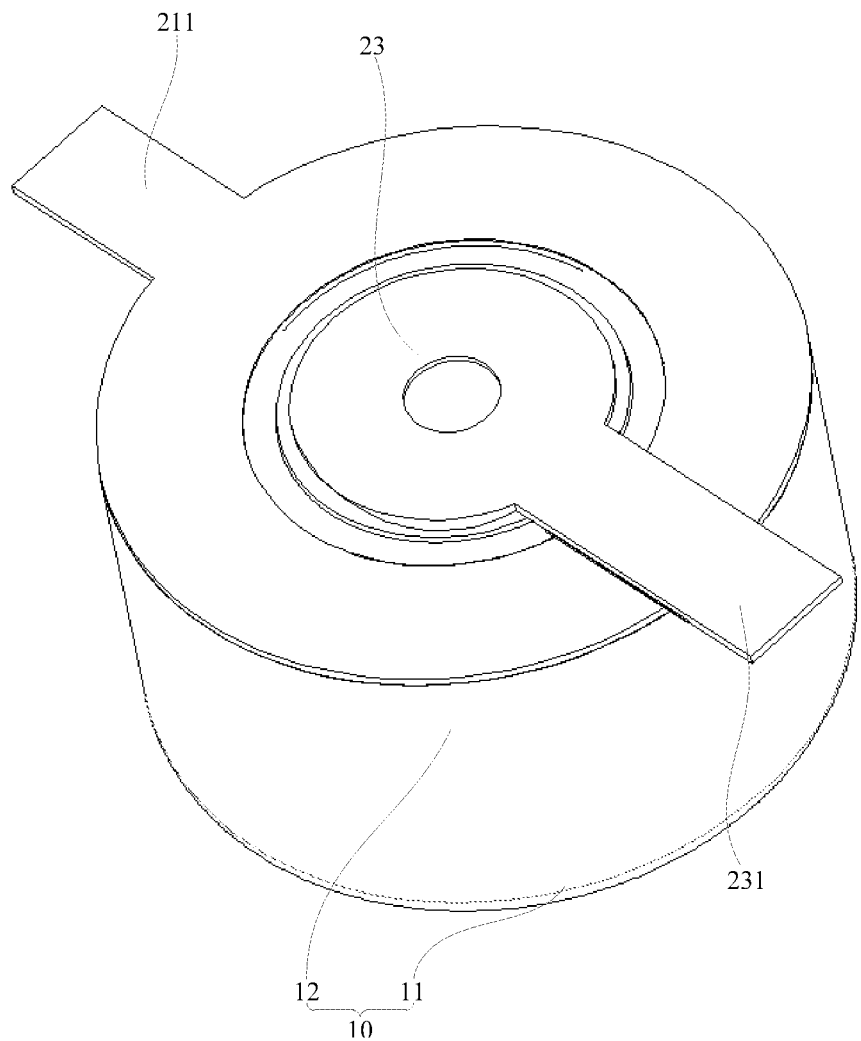
FIG. 23 is a schematic diagram of a third structure the button cell provided in Embodiment 2 of the present disclosure.
Figure 24:
FIG. 24 is a schematic diagram of a first cross-sectional structure of the conductive member in FIG. 23.
Figure 25:
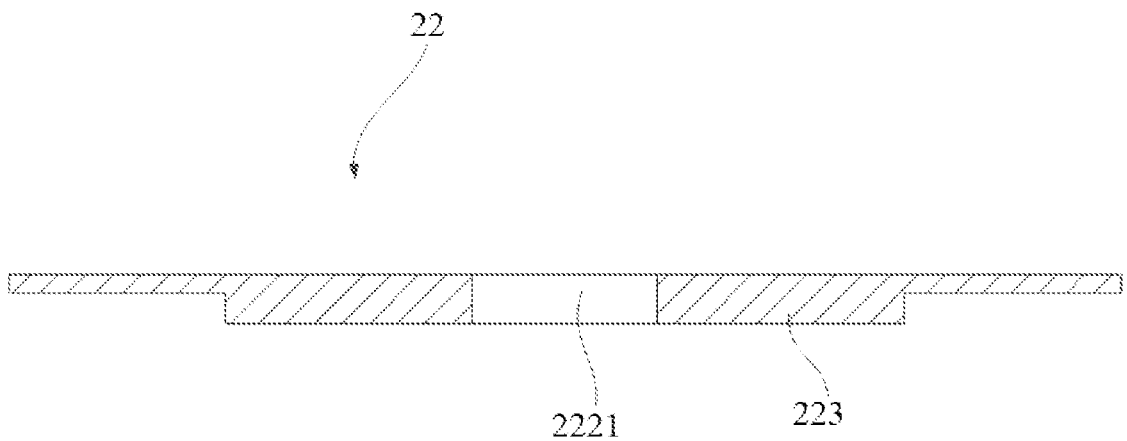
FIG. 25 is a schematic diagram of a second cross-sectional structure of the conductive member in FIG. 23.
Figure 26:
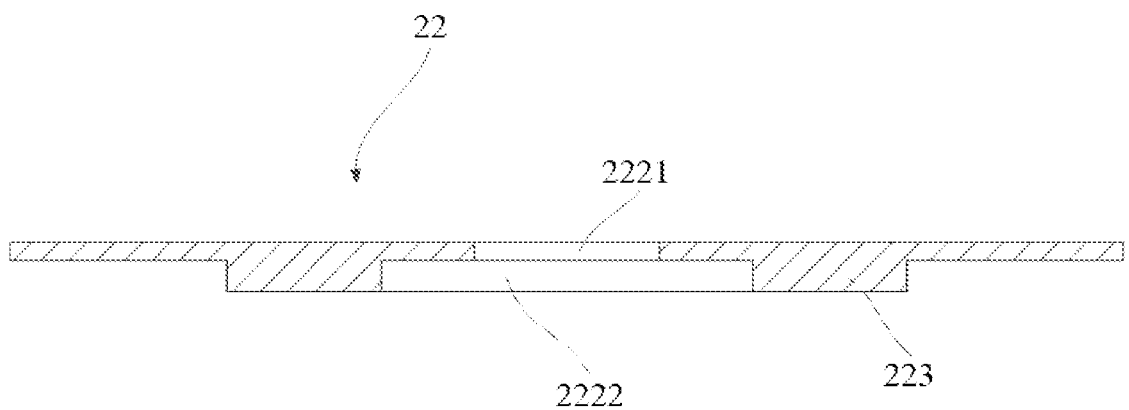
FIG. 26 is a schematic diagram of a third cross-sectional structure of the conductive member in FIG. 23.
Figure 27:
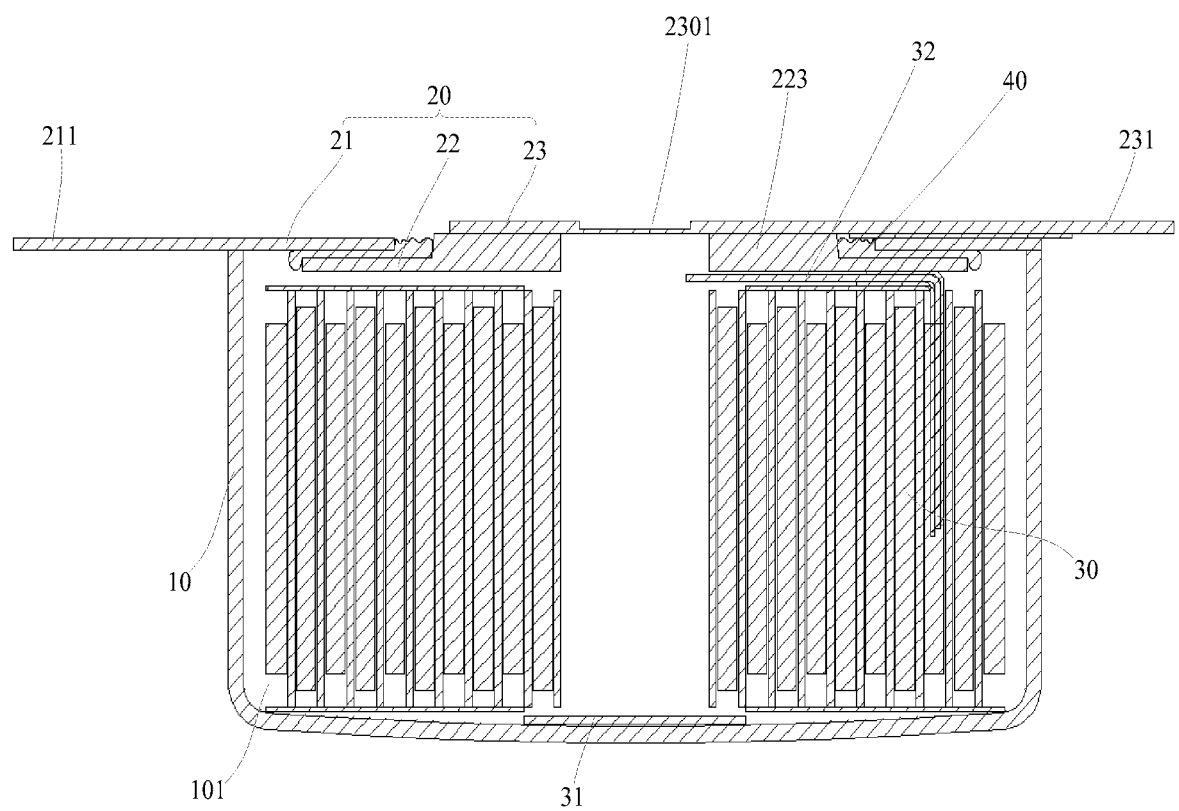
FIG. 27 is a structural schematic diagram of an application state of the conductive member in FIG. 25.

FIG. 23 is the schematic diagram of a third structure of the button cell provided in Embodiment 2 of the present disclosure; FIG. 24 is the schematic diagram of a first cross-sectional structure of the conductive member in FIG. 23; FIG. 25 is the schematic diagram of a second cross-sectional structure of the conductive member in FIG. 23; FIG. 26 is the schematic diagram of a third cross-sectional structure of the conductive member in FIG. 23; and FIG. 27 is the structural schematic diagram of the application state of the conductive member in FIG. 25.

Optionally, the conductive member 22 is not provided with a second electrical connection portion 221 that is integrally formed with the conductive member 22, the conductive member 22 is arranged on the side of the head cover 21 facing the accommodating cavity 101, the surface of the conductive member 22 butted with the head cover 21 is a horizontal plane, and an insulating part 40 is arranged between the conductive member 22 and the head cover 21.

The conductive covering member 23 includes a conductive covering member body 232, a third electrical connection portion 231 and a bending portion 233. The bending portion 233 is arranged between the conductive covering member body 232 and the third electrical connection portion 231, both the conductive covering member body 232 and the third electrical connection portion 231 are perpendicular to the bending portion 233, the conductive covering member body 232 is arranged on the side of the conductive member 22 away from the accommodating cavity 101, the conductive covering member body 232 is welded with the conductive member 22, and the third electrical connection portion 231 protrudes beyond the side wall 12, and an insulating part 40 is arranged between the third electrical connection portion 231 and the head cover 21. For example, the through hole 2101 is a circular hole, the conductive covering member body 232 is disc-shaped, and the diameter of the through hole 2101 is greater than that of the conductive covering member body 232.

For example, the head cover 21 is disc-shaped, the through hole 2101 is circular hole, the conductive member 22 is disc-shaped, the diameter of the through hole 2101 is less than that of the conductive member 22, and the diameter of the conductive member 22 is less than that of the head cover 21. Therefore, at least parts of the edge of the conductive member 22 and the edge of the through hole 2101 are stacked along the radial direction, the through hole 2101 and the conductive member 22 are closely bonded by heating and pressuring through the insulating part 40, and the insulating part 40 under high heat and high pressure can make the connection between the through hole 2101 and the conductive member 22 closer, thereby improving the sealing performance of the button cell.

Optionally, when the conductive member 22 is arranged on the inner side of the housing 10, in order to improve the insulating effect between the third electrical connection portion 231 and the first electrical connection portion 211, a boss 223 is disposed at one end of the conductive member 22 away from the accommodating cavity 101, that is, the conductive member 22 is provided with an upward projecting boss 223. The liquid injection port 2221 is arranged in the boss 223, and the center of the boss 223 coincides with the center of the liquid injection port 2221, the boss 223 is disposed in the through hole 2101, and an insulating part 40 is arranged between the boss 223 and the through hole 2101.

Optionally, when the conductive member 22 is arranged on the side of the head cover 21 facing the accommodating cavity 101, one end of the conductive member 22 away from the accommodating cavity 101 is provided with a boss 223, which is provided with a second counter bore 2222 for installing the conductive covering member 23. The center of the second counter bore 2222 coincides with that of the liquid injection port 2221, and the conductive covering member body 232 is disposed in the second counter bore 2222. After the electrolyte is injected into the accommodating cavity 101 through the liquid injection port 2221, the joint between the conductive covering member body 232 and the second counter bore 2222 is welded on the outside of the head cover 21, thereby improving the sealing performance between the conductive covering member body 232 and the liquid injection port 2221.

It should be noted that by setting the second counter bore 2222 on the conductive member 22, the conductive covering member body 232 is located in the second counter bore 2222, and the surface of the conductive covering member 23 away from the accommodating cavity 101 is flush with the surface of the conductive member 22 away from the accommodating cavity 101. In this way, the overall aesthetics of the button cell can be improved.

Optionally, the conductive covering member 23 is provided with a thinning area 2301.

Because the button cell has a closed space, the pressure in the accommodating cavity 101 is relatively large. When the pressure is too large, the damage degree caused will be great if explosion and other conditions occur. In order to improve the safe reliability of the button cell, the conductive covering member 23 in the present disclosure is provided with a thinning area 2301. Since the pressure bearing capacity of the thinning area 2301 is less than that of the area without thinning area 2301, when the pressure inside the button cell increases to the maximum critical value of the pressure that the thinning area 2301 can bear, at this time, crack or direct fracture will occur to the thinning area 2301 under the driving of the pressure. The pressure inside the button cell may be reduced through venting from the crack or fracture of the thinning area 2301, at this time, the pressure inside the battery has not reached the maximum critical value of the pressure that the non-thinning area is capable of bearing. Therefore, if the battery explodes, the destructive power will be greatly reduced, thereby improving the safe reliability of the button cell.

Optionally, the thinning area 2301 is located on the side of the conductive covering member 23 away from the accommodating cavity 101. By setting the thinning area 2301 on the side of the conductive covering member 23 away from the accommodating cavity 101, that is, the side of the conductive covering member 23 facing the accommodating cavity 101 is a flat plane. In this way, while the safe reliability of the battery is improved, the corrosion due to the electrolyte in the accommodating cavity 101 to the connection between the thinning area 2301 and the non-thinning area, which reduces the life of the battery, may be avoided.

In an optional embodiment, a groove is disposed on the side of the conductive covering member 23 away from the accommodating cavity 101, and forms the thinning area 2301. Due to a groove disposed on the side of the conductive covering member 23 away from the accommodating cavity 101, a thinning area 2301 is formed, which has simple structure and low processing cost.

Optionally, the thinning area 2301 may be at least one of a cross groove, an annular groove or a circular groove.

For example, as shown in FIG. 19 and FIG. 20, the thinning area 2301 is a cross groove; as shown in FIG. 17 and FIG. 18, the thinning area 2301 is a circular groove; as shown in FIG. 21 and FIG. 22, the thinning area 2301 is a combination of a circular groove and a cross groove; as shown in FIG. 15 and FIG. 16, the thinning area 2301 is a circular groove. The thinning area 2301 may also be a groove of oval shape, rectangular shape, other any regular shape or a combination of at least two shapes, and may also be a groove of any irregular shape, or may be groove of a combination of regular shape or irregular shape, which is not specifically limited here.

Optionally, in order to facilitate the processing of the thinning area 2301, the center of the thinning area 2301 coincides with that of the liquid injection port 2221, in this way, upon the processing of the thinning area 2301, it is convenient to align the center of the thinning area 2301 during processing.

In an optional embodiment, the depth of the groove is 0.01-0.1 mm. In this way, the strength requirements of the conductive covering member 23 is met during normal operation, at the same time, when the internal pressure of the button cell is too high, the exhaust and pressure relief may be carried out in advance to reduce the damage caused by the explosion of the button cell, thereby improving the safe reliability of the button cell.

Further, the thinning area 2301 may be integrally formed with the conductive covering member 23, so that the processing process for forming the conductive covering member 23 and the thinning area 2301 is reduced, thereby reducing the processing cost.

Optionally, the conductive covering member 23 may be a sheet structure, that is, the conductive covering member 23 is a sealing sheet, so the surface of the conductive covering member 23 facing the accommodating cavity 101 is a flat plane. In this way, the strength of the conductive covering member 23 may be improved, thereby improving the operational reliability of the conductive covering member 23.

In addition, the conductive covering member 23 is configured as a sealing sheet, that is, the thickness of the conductive covering member 23 is relatively thin. When the thickness of the conductive covering member 23 is relatively thin, the pressure that it can withstand is relatively small. Therefore, when the pressure inside the battery exceeds the pressure that the conductive covering member 23 can withstand, the destructive force caused by the battery explosion may be reduced upon the explosion of the battery.

Embodiment 3

Figure 28:
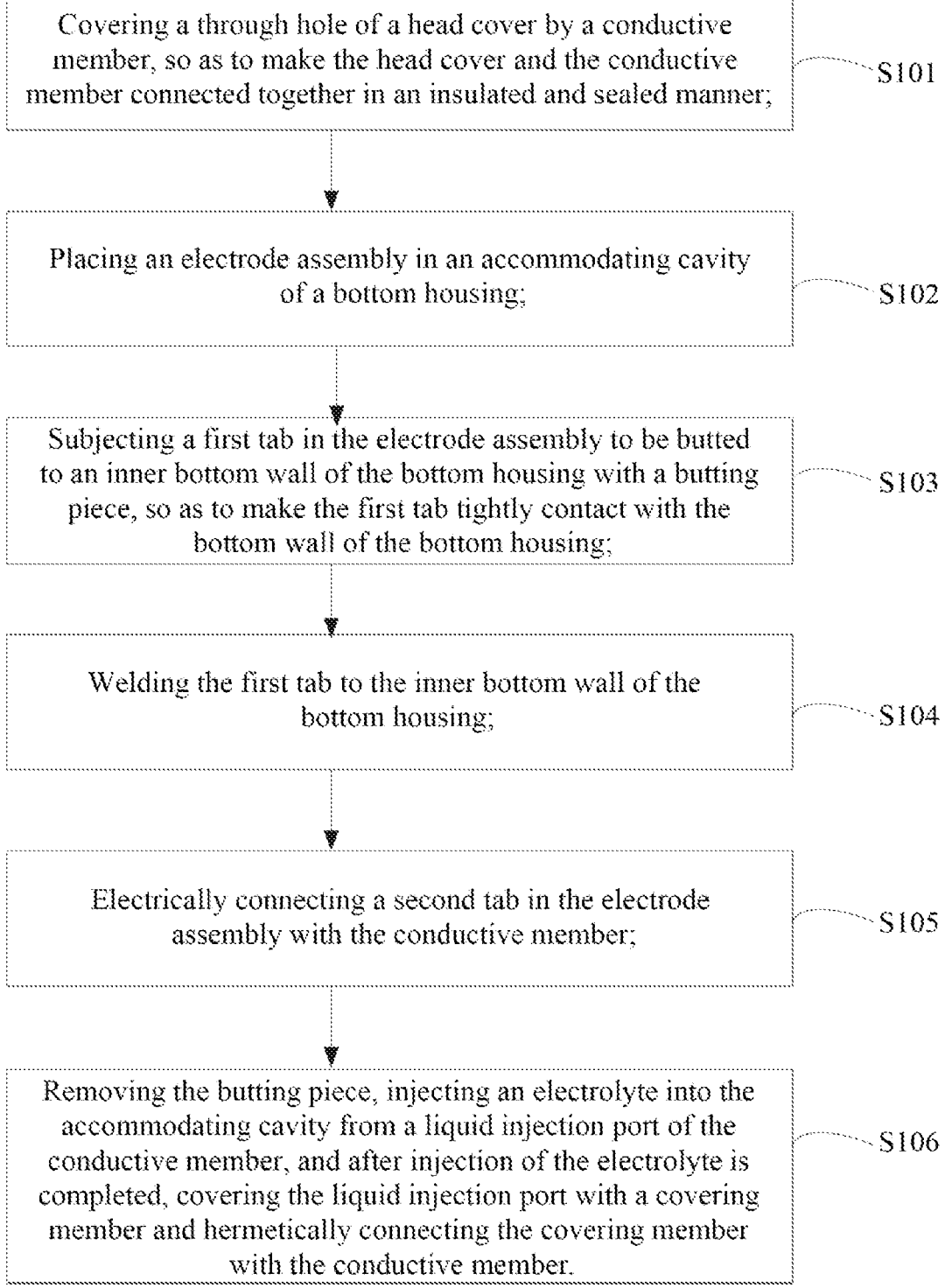
FIG. 28 is a flowchart of a manufacturing method of a button cell provided in Embodiment 3 of the present disclosure.

As shown in FIG. 28, this embodiment provides a manufacturing method of a button cell, which includes the following steps.

At S101, a through hole of a head cover is covered by a conductive member, so as to make the head cover and the conductive member connected together in an insulated and sealed manner.

An insulating part is disposed between the head cover and the conductive member. The head cover and the conductive member are extruded and connected together first by means of heating and pressurizing, and the insulating part is deformed by extrusion, so as to improve the sealing performance between the head cover and the conductive member.

At S102, an electrode assembly is placed in an accommodating cavity.

At S103, a first tab in the electrode assembly is abutted to a bottom wall of a housing with a butting piece to make the first tab tightly contact with the bottom wall of the housing.

At S104, the first tab is welded to the bottom wall of the housing.

At S105, a second tab in the electrode assembly is electrically connected with the conductive member.

At S106, the butting piece is removed and an electrolyte is injected into the accommodating cavity from a liquid injection port in the conductive member. After the injection of electrolyte is completed, a conductive covering member covers the liquid injection port and is hermetically connected with the conductive member.

It should be noted that, it is also possible that the second tab in the electrode assembly is first electrically connected with the conductive member before the head cover provided with the conductive member is hermetically connected with the side wall of the housing.

It is easy to understand that after the first tab is electrically connected with the bottom wall of the housing, since the side wall of the housing is electrically connected with the head cover, the first tab of the electrode assembly may provide electric energy for the negative or positive electrode of the electronic equipment through the head cover and the first electrical connection portion.

Optionally, before the head cover and the conductive member are connected together in an insulated and sealed manner through insulating part, the following step is further included.

A passivation treatment is performed on the head cover and the conductive member.

The passivation treatment refers to a process that metal is oxidized by a strong oxidant or an electrochemical method to make its surface inactive, i.e. passivated. This treatment is a method to transform the metal surface into a state that is not easy to be oxidized so as to delay the corrosion rate of the metal.

Optionally, before the first tab in the electrode assembly is welded with the bottom wall of the housing, the following step is further included.

The butting piece that is placed in the electrode assembly cavity is extruded from the liquid injection port; and the butting piece extrudes the first tab in the electrode assembly to make it tightly contact with the bottom wall of the housing.

In the manufacturing method of the button cell provided by this embodiment, the through hole of the head cover is covered by the conductive member, the head cover and the conductive member are connected together in an insulated and sealed manner through the insulating part, the electrode assembly is placed in the accommodating cavity, the first tab of the electrode assembly is welded with the bottom wall of the housing, and then the head cover with the conductive member is hermetically connected with the housing, the second tab of the electrode assembly is electrically connected with the conductive member, and finally the electrolyte is injected into the accommodating cavity from the liquid injection port in the conductive member. After the injection of electrolyte is completed, the conductive covering member convers and is hermetically connected with the liquid injection port, thereby improving the sealing performance of the button cell.

Figure 29:
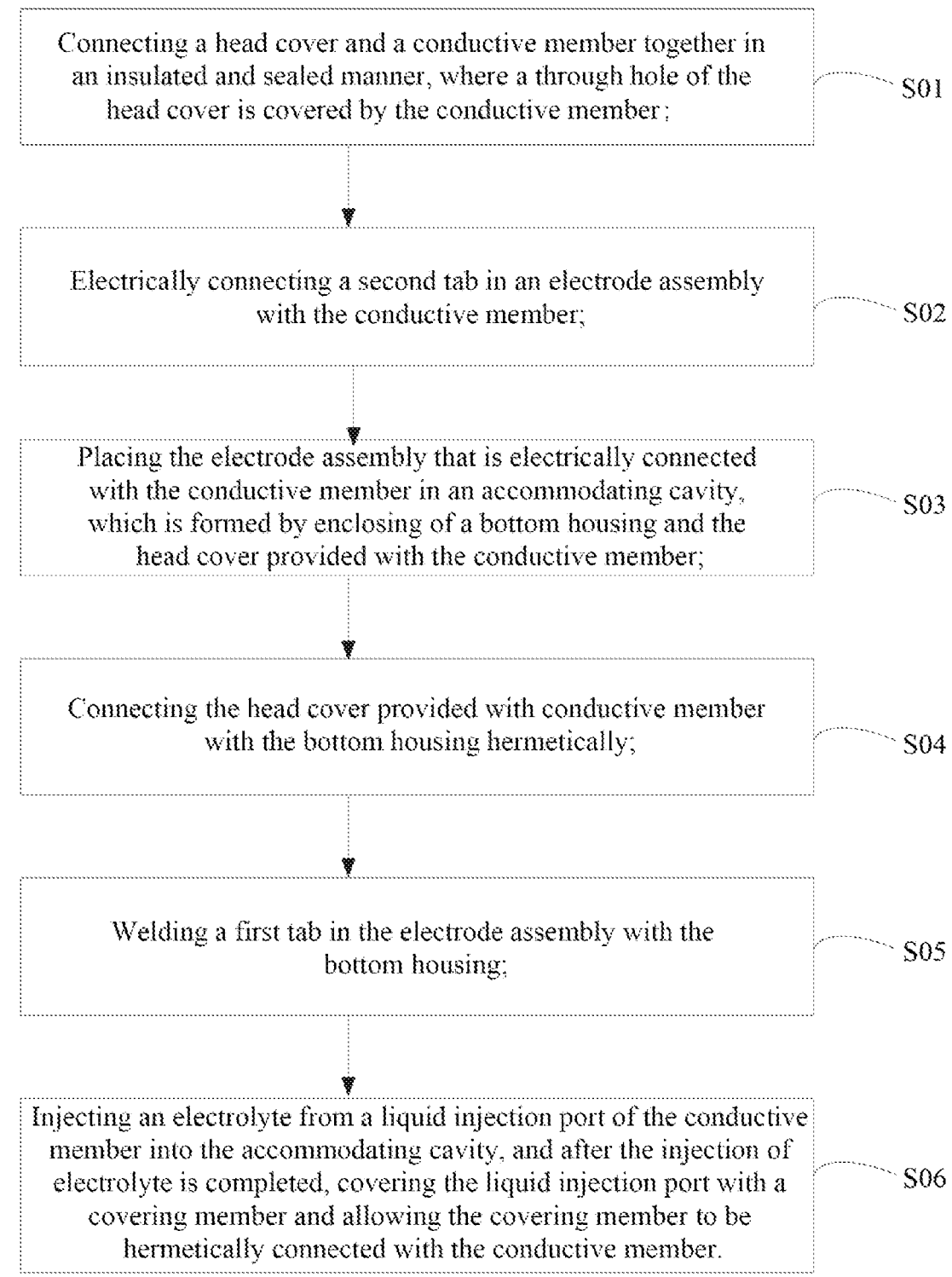
FIG. 29 is a flowchart of another manufacturing method of a button cell provided in Embodiment 3 of the present disclosure.

As shown in FIG. 29, this embodiment also provides another manufacturing method of button cell, which includes the following steps.

At S01, the head cover and the conductive member are connected together in an insulated and sealed manner, where the through hole of the head cover is covered by the conductive member.

At S02, the second tab in the electrode assembly is electrically connected with the conductive member.

At S03, the electrode assembly that is electrically connected with the conductive member is placed in the accommodating cavity.

At S04, the head cover provided with conductive member is hermetically connected with the housing.

At S05, the first tab in the electrode assembly is welded with the housing.

At S06, the electrolyte is injected from the liquid injection port of the conductive member into the accommodating cavity. After the injection of electrolyte is completed, the conductive covering member covers the liquid injection port and is hermetically connected with the conductive member.

It should be noted that, it is also possible that, after the head cover that is provided with the conductive member is connected with the housing in a sealed manner, the second tab in the electrode assembly is electrically connected with the conductive member.

In a specific implementation of the manufacturing method of the button cell provided by the embodiment of the present application, firstly, the head cover and the conductive member are connected in an insulated and sealed manner through the insulating part by means of heating and pressurization, the conductive member is electrically connected with the second tab, the electrode assembly that is electrically connected with the conductive member through the second tab is placed in the accommodating cavity, the housing is covered by the head cover with the conductive member, and the side wall of the housing is hermetically connected with the head cover by bonding or welding. The butting piece may be inserted from the liquid injection port and butted to the first tab so as to make the first tab tightly contact with the bottom wall of the housing. The first tab is welded to the bottom wall of the housing by a welding equipment, and then the butting piece is taken out from the liquid injection port, and the conductive covering member covers the liquid injection port and is bonded to the conductive member by welding or bonding. In order to improve the sealing performance, a seal may also be added at the conductive covering member and the liquid injection port, so as to improve the sealing performance of the button cell.

When the first tab and the bottom wall of the housing are welded first and then the housing and head cover are welded, the first tab and the bottom wall will shake due to welding, which will loosen the welding between the first tab and the bottom wall of the housing, resulting in the problem of low reliability of the electrical connection between the first tab and the bottom wall of the housing. In this embodiment, welding the housing and the head cover first and then welding the first tab and the bottom wall of the housing, can improve the welding reliability of the first tab and the bottom wall, thereby improving the electrical connection reliability between the first tab and the bottom wall of the housing.

Embodiment 4

The embodiment provides an electronic equipment, which includes an electronic equipment body and a button cell. The button cell provides electric energy for the electronic equipment body.

The structure of the button cell in the electronic equipment provided by the present disclosure is the same as that of the button cell described above, and can bring the same or similar technical effects, which will not be repeated here.

Finally, the technical solution of the present disclosure has been described in combination with the preferred embodiments shown in the attached drawings. However, it is easy for those skilled in the art to understand that the protection scope of the present disclosure is obviously not limited to these specific embodiments. On the premise of not deviating from the principle of the present disclosure, those skilled in the art can make equivalent modifications or substitutions to the relevant technical features, and the technical solutions obtained by these modifications or substitutions will fall within the protection scope of the present disclosure.

What is claimed is:

1. A button cell, comprising: a housing and a cover plate assembly, wherein
   the housing comprises a bottom wall and an annular side wall, the side wall being integrally formed with the bottom wall;
   the cover plate assembly comprises a head cover, a conductive member and a conductive covering member, a through hole is disposed in a middle area of the head cover and is covered by the conductive member, and the conductive member is connected with the head cover in an insulated manner;
   an outer edge of the head cover is welded with a top end of the side wall to form an accommodating cavity for accommodating an electrode assembly and electrolyte;
   the conductive member has a liquid injection port for injecting the electrolyte into the accommodating cavity, and the conductive covering member covers the liquid injection port and is electrically connected with the conductive member.

2. The button cell according to claim 1, wherein the head cover is provided with a first electrical connection portion that is integrally formed with the head cover, and the first electrical connection portion protrudes beyond the side wall.

3. The button cell according to claim 2, wherein a width of the first electrical connection portion is 1 mm-3 mm, and a length of the first electrical connection portion protruding beyond the side wall is greater than 1 mm.

4. The button cell according to claim 2, wherein the upper surface of the first electrical connection portion is not lower than that of the head cover.

5. The button cell according to claim 2, wherein the conductive member comprises a conductive member body and a second electrical connection portion, which are integrally formed, the second electrical connection portion protrudes beyond the side wall, the first electrical connection portion and the second electrical connection portion carry opposite charges, and an included angle between a protruding direction of the first electrical connection portion and a protruding direction of the second electrical connection portion is not less than 90°.

6. The button cell according to claim 5, wherein an upper surface of the second electrical connection portion is not lower than that of the conductive member body, and an upper surface of the second electrical connection portion is higher than that of the first electrical connection portion.

7. The button cell according to claim 5, wherein a width of the second electrical connection portion is 1 mm-3 mm, and a length of the second electrical connection portion protruding beyond the side wall is greater than 1 mm.

8. The button cell according to claim 2, wherein the conductive covering member comprises a conductive covering member body and a third electrical connection portion, which are integrally formed, and the third electrical connection portion protrudes beyond the side wall; and
   an included angle between a protruding direction of the first electrical connection portion and a protruding direction of the third electrical connection portion is not less than 90°.

9. The button cell according to claim 8, wherein an upper surface of the third electrical connection portion is higher than that of the first electrical connection portion.

10. The button cell according to claim 8, wherein a width of the third electrical connection portion is 1 mm-3 mm, and a length of the third electrical connection portion protruding beyond the side wall is greater than 1 mm.

11. The button cell according to claim 8, wherein an insulating part is arranged between the third electrical connection portion and the head cover.

12. The button cell according to claim 8, wherein the conductive member is arranged over the head cover; and
   the head cover is provided with a first counter bore, and the conductive member is located in the first counter bore.

13. The button cell according to claim 12, wherein the conductive member is provided with a second counter bore, and the center of the second counter bore coincides with that of the liquid injection port;
   a bending portion is arranged between the conductive covering member body and the third electrical connection portion, both the conductive covering member body and the third electrical connection portion are perpendicular to the bending portion, the conductive covering member body is arranged in the second counter bore, the third electrical connection portion protrudes beyond the side wall, and a sealing structure is arranged between the third electrical connection portion and the first electrical connection portion.

14. The button cell according to claim 13, wherein a height of the bending portion is 0.1 mm-0.5 mm.

15. The button cell according to claim 8, wherein the conductive member is arranged under the head cover; and
   the conductive member is provided with a boss protruding upward and located in the through hole and an insulating part is arranged between the boss and the through hole, the liquid injection port passes through the boss, and the boss is provided with a counter bore for installing the conductive covering member body.

16. The button cell according to claim 8, wherein the conductive covering member body is welded with the conductive member.

17. The button cell according to claim 1, wherein the conductive member is arranged over the head cover; and
   the head cover is provided with a counter bore for installing the conductive member.

18. The button cell according to claim 17, wherein the conductive member is provided with a counter bore for installing the conductive covering member; and
   the conductive member is provided with a boss protruding downward and located in the through hole and an insulating part is arranged between the boss and the through hole, the liquid injection port passes through the boss, and the boss is provided with a counter bore for installing the conductive covering member.

19. The button cell according to claim 1, wherein the conductive covering member is provided with a groove, and the center of the groove coincides with that of the liquid injection port; and
   the groove is located on an upper surface of the conductive covering member.

20. An electronic equipment, comprising an electronic equipment body and the button cell according to claim 1, wherein the button cell provides electric energy for the electronic equipment body.

* * * * *